(12) United States Patent
Kim

(10) Patent No.: US 11,445,142 B2
(45) Date of Patent: Sep. 13, 2022

(54) DIGITAL CORRELATED DOUBLE SAMPLING CIRCUIT AND IMAGE SENSOR INCLUDING THE SAME

(71) Applicant: SAMSUNG ELECTRONICS CO., LTD., Suwon-si (KR)

(72) Inventor: Sungyong Kim, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/465,586

(22) Filed: Sep. 2, 2021

(65) Prior Publication Data

US 2022/0109802 A1 Apr. 7, 2022

(30) Foreign Application Priority Data

Oct. 5, 2020 (KR) .................. 10-2020-0127968

(51) Int. Cl.
| | |
|---|---|
| H04N 5/257 | (2006.01) |
| H04N 5/376 | (2011.01) |
| H04N 5/365 | (2011.01) |
| H04N 5/378 | (2011.01) |
| H04N 5/357 | (2011.01) |

(52) U.S. Cl.
CPC ........... *H04N 5/378* (2013.01); *H04N 5/3575* (2013.01); *H04N 5/3765* (2013.01); *H04N 5/3658* (2013.01)

(58) Field of Classification Search
None
See application file for complete search history.

(56) References Cited

U.S. PATENT DOCUMENTS

| | | | |
|---|---|---|---|
| 5,434,619 A | 7/1995 | Yonemoto | |
| 8,514,306 B2 | 8/2013 | Jung et al. | |
| 9,077,919 B2 | 7/2015 | Wakabayashi et al. | |
| 9,191,599 B2 | 11/2015 | Park et al. | |
| 2017/0237928 A1* | 8/2017 | Kusano | H03M 1/56 348/294 |

FOREIGN PATENT DOCUMENTS

| | | |
|---|---|---|
| JP | 3162206 A | 4/1994 |
| KR | 1191971 A | 5/2012 |
| KR | 1905105 A | 8/2018 |

\* cited by examiner

*Primary Examiner* — Mark T Monk
(74) *Attorney, Agent, or Firm* — Volentine, Whitt & Francos, PLLC

(57) ABSTRACT

A digital correlated double sampling circuit includes a first latch circuit, a second latch circuit, a decision circuit, a delay control circuit and a calculating circuit. The first latch circuit stores first reset component data. The second latch circuit stores second reset component data and stores image component data based on a selected comparison signal during an image interval. The decision circuit outputs a decision signal by determining identity of the first reset component data and the second reset component data during the reset interval. The delay control circuit outputs the reset comparison signal and outputs one of the first image comparison signal and the second comparison signal as the selected comparison signal. The calculating circuit generates effective image data by subtracting the second reset component data from the image component data and sequentially outputs the effective image data.

20 Claims, 21 Drawing Sheets

FIG. 6

| IDS | DS | SELECTION |
|-----|----|-----------|
| 0 | 0 | ICS1 |
| 0 | 1 | ICS2 |
| 1 | X | RCS |
| 1 | X | RCS |

DIGITAL CORRELATED DOUBLE SAMPLING CIRCUIT AND IMAGE SENSOR INCLUDING THE SAME

CROSS-REFERENCE TO RELATED APPLICATION

This application claims priority under 35 USC § 119 to Korean Patent Application No. 10-2020-0127968, filed on Oct. 5, 2020 in the Korean Intellectual Property Office (KIPO), the contents of which are herein incorporated by reference in their entirety.

BACKGROUND

1. Technical Field

Example embodiments relate generally to correlated double sampling (CDS) technologies, and more particularly to digital CDS circuits and image sensors including the digital CDS circuits.

2. Description of the Related Art

Charge coupled device (CCD) image sensors and complementary metal oxide semiconductor (CMOS) image sensors have been used as devices for capturing images. Typically, analog pixel signals output from a pixel array of the CMOS image sensor may have variations due to differences between intrinsic characteristics of pixels, such as fixed pattern noise (FPN), and digital pixel signals generated based on the analog pixel signals may have variations due to differences between characteristics of analog-to-digital converters (ADC) corresponding to columns of the pixel array of the CMOS image sensor. To compensate such variations, correlated double sampling (CDS) technologies may be used to operate the CMOS image sensors.

SUMMARY

Some example embodiments provide a digital correlated double sampling (CDS) circuit capable of increasing a number of effective bits without increasing a number of bits of a count signal.

Some example embodiments provide an image sensor including the digital CDS circuit.

According to example embodiments, a digital correlated double sampling (CDS) circuit includes a first latch circuit, a second latch circuit, a decision circuit, a delay control circuit and a calculating circuit. The first latch circuit stores first reset component data by latching a count signal based on a first comparison signal during a reset interval. The second latch circuit stores second reset component data by latching the count signal based on a reset comparison signal during the reset interval and stores image component data by latching the count signal based on a selected comparison signal during an image interval. The selected comparison signal is selected from a first image comparison signal and a second image comparison signal. The decision circuit outputs a decision signal by determining identity of the first reset component data and the second reset component data during the reset interval. The delay control circuit outputs the reset comparison signal by delaying the first comparison signal based on an interval direction signal indicating one of the reset interval and the image interval during the reset interval and outputs one of the first image comparison signal and the second comparison signal as the selected compari-son signal based on the interval direction signal and the decision signal during the image interval. The calculating circuit generates effective image data by subtracting the second reset component data from the image component data and sequentially outputs the effective image data.

According to example embodiments, a digital correlated double sampling (CDS) circuit includes a first latch circuit, a second latch circuit, a decision circuit, a switch circuit and a calculating circuit. The first latch circuit stores first reset component data by latching a first count signal based on a first comparison signal during a reset interval and stores first image component data by latching the first count signal based on a second comparison signal during an image interval. The second latch circuit stores second reset component data by latching a second count signal based on the first comparison signal during the reset interval and stores second image component data by latching the second count signal based on the second comparison signal during the image interval. The second comparison signal is obtained by delaying the first count signal by a first delay amount. The decision circuit outputs a decision signal based on an interval direction signal during the reset interval and outputs the decision signal based on the interval direction signal and identity of the first image component data and the second image component data. The switch circuit, connected to the first latch circuit and the second latch circuit, outputs the second reset component data during the reset interval and outputs one of the first image component data and the second image component data as a selected image component data during the image interval. The calculating circuit, connected to the switch circuit, generates effective image data by subtracting the second reset component data from the selected image component data and sequentially outputs the effective image data. The interval direction signal designates one of the reset interval and the image interval.

According to example embodiments, an image sensor includes a pixel array, a comparison block, a global counter and a digital correlated double sampling (CDS) block. The pixel array generates a plurality of analog pixel signals based on incident light. The comparison block generates a plurality of first comparison signals and a plurality of second comparison signals by comparing the plurality of analog pixel signals with a ramp signal. The global counter generates a count signal based on a counter clock signal. The digital CDS block generates a plurality of effective image data corresponding to the plurality of analog pixel signals by performing a digital CDS based on the plurality of first comparison signals, the plurality of second comparison signals and the count signal. The comparison block includes a plurality of comparators, each comparator receives a respective one of the plurality of analog pixel signals. The digital CDS block includes a plurality of digital CDS circuits, and each digital CDS circuit is connected to a respective one of the plurality of comparators. Each digital CDS circuit includes a first latch circuit, a second latch circuit, a decision circuit, a delay control circuit and a calculating circuit. The first latch circuit stores first reset component data by latching the count signal based on respective one of the plurality of first comparison signals during a reset interval. The second latch stores second reset component data by latching the count signal based on a reset comparison signal during the reset interval and stores image component data by latching the count signal based on a selected comparison signal during an image interval. The selected comparison signal is selected from a first image comparison signal and a second image comparison signal, the first image comparison signal and the second image comparison signal are obtained by delaying respective one of the plurality of second comparison signals. The decision circuit outputs a decision signal by determining bit-wise identity of the first reset component data and the second reset component data. The delay control circuit outputs the reset comparison signal by delaying the first comparison signal based on an interval direction signal indicating one of the reset interval and the image interval during the reset interval and outputs one of the first image comparison signal and the second comparison signal as the selected comparison signal based on the interval direction signal and the decision signal during the image interval. The calculating circuit generates effective image data by subtracting the second reset component data from the image component data and sequentially outputs the effective image data.

Accordingly, the digital CDS circuit according to example embodiments may latch the first reset component data and the second reset component data by a gap of a first delay amount and may determine a timing of latching the image component data based on whether the first reset component data is the same as the second reset component data. Therefore, the digital CDS circuit may reduce quantization noise and increase a number of effective bits without increasing a number of bits of the count signal by latching the image component data at a center of LSB of the count signal.

BRIEF DESCRIPTION OF THE DRAWINGS

Illustrative, non-limiting example embodiments will be more clearly understood from the following detailed description taken in conjunction with the accompanying drawings.

FIG. 6 illustrates various signals of the delay control circuit in FIGS. 2A and 2B during a reset interval and an image interval.

DETAILED DESCRIPTION OF THE EMBODIMENTS

Various example embodiments will be described more fully with reference to the accompanying drawings, in which embodiments are shown.

Figure 1:
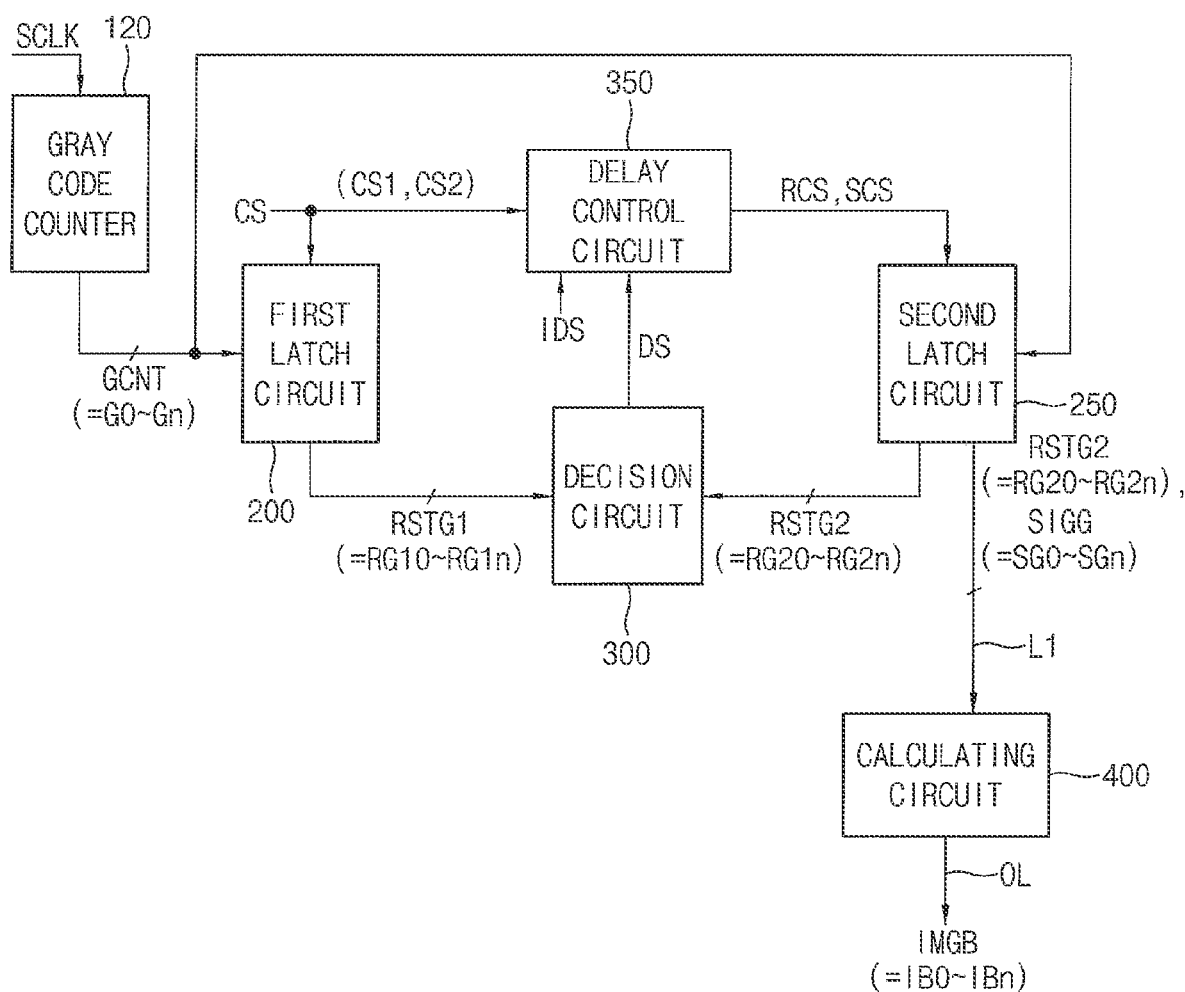
FIG. 1 is a block diagram illustrating a digital correlated double sampling (CDS) circuit according to example embodiments.

FIG. 1 is a block diagram illustrating a digital correlated double sampling (CDS) circuit according to example embodiments.

A digital CDS circuit 100 illustrated in FIG. 1 may be applied to an image sensor that performs a CDS operation on an analog pixel signal output from a pixel array. Hereinafter, the digital CDS circuit according to example embodiments will be described based on a complementary metal-oxide semiconductor (CMOS) image sensor. However, the digital CDS circuit according to example embodiments may be applied to any image sensor, such as a charge-coupled device (CCD) image sensor. Detailed configurations of a CMOS image sensor and a unit pixel will be described below with reference to FIGS. 15 and 16.

The CDS on an analog pixel signal may correspond to quantizing the analog pixel signal and sampling the quantized analog pixel signal. It is noted that quantization noise in a case of sampling centers of quantized signals is smaller than quantization noise in a case of sampling edges of quantized signals. Sampling the quantized signals may correspond to latching a comparison signal based on a count signal.

Referring to FIG. 1, the digital CDS circuit 100 may include a first latch circuit 200, a second latch circuit 250, a decision circuit 300, a delay control circuit 350 and a calculating circuit 400. In example embodiments, the digital CDS circuit 100 may further include a Gray code counter 120. The Gray code counter 120 may generate a count signal GCNT based on a counter clock signal SCLK.

The first latch circuit 200 may store first reset component data RSTG1 by latching the count signal GCNT based on a first comparison signal CS1 during a reset interval. The second latch circuit 250 may store second reset component data RSTG2 by latching the count signal GCNT based on a reset comparison signal RCS during the reset interval and may store an image component data SIGG by latching the count signal GCNT based on a selected comparison signal SCS during an image interval. The reset comparison signal RCS may be obtained by delaying the first comparison signal CS1, and the selected comparison signal SCS may being selected from a first image comparison signal and a second image comparison signal which are obtained by delaying a second comparison signal CS2 by different delay amounts. The first comparison signal CS1 may denote a comparison signal CS during the reset interval and the second comparison signal CS2 may denote a comparison signal CS during the image interval.

The count signal GCNT may be a (n+1)-bit Gray code that is generated from the Gray code counter 120, where n is a natural number. For example, the count signal GCNT may include a first bit G0 through a (n+1)-th bit Gn and may have a sequentially increased value. The image component data SIGG may be a first Gray code that is one of values of the count signal GCNT and corresponds to an image component of the analog pixel signal, and a second reset component data RSTG2 may be a second Gray code that is another one of the values of the count signal GCNT and corresponds to a reset component of the analog pixel signal. Both the image component data SIGG and the digital reset component data RSTG may be (n+1)-bit Gray codes. For example, the image component data SIGG may include a first bit SG0 through a (n+1)-th bit SGn, the first reset component data RSTG1 may include a first bit RG10 through a (n+1)-th bit RG1$n$ and the second reset component data RSTG2 may include a first bit RG20 through a (n+1)-th bit RG2$n$.

The first latch circuit 200 and the second latch circuit 250 may substantially simultaneously receive all bits G<0>~G<n> of the count signal GCNT from the Gray code counter 120 through a plurality of signal lines (e.g., (n+1) signal lines).

The decision circuit 300 may output a decision signal DS by determining a bit-wise identity of the first reset component data RSTG1 and the second reset component data RSTG2 during the reset interval. The decision circuit 300 may determine the bit-wise identity between each of the first bit RG10 through the (n+1)-th bit RG1$n$ of the first reset component data RSTG1 and respective one of the first bit RG20 through the (n+1)-th bit RG2$n$ of the second reset component data RSTG2 to provide the decision signal DS to the delay control circuit 350.

The delay control circuit 350 may output the reset comparison signal RCS to the second latch circuit 250 by delaying the first comparison signal CS1 based on an interval direction signal IDS indicating one of the reset interval and the image interval during the reset interval, and may output one of the first image comparison signal and the second comparison signal as the selected comparison signal SCS to the second latch circuit 250 based on the interval direction signal IDS and the decision signal DS during the image interval. That is, the delay control circuit 350 may provide the reset comparison signal RCS to the second latch circuit 250 by delaying the first comparison signal CS1 by a first delay amount based on the interval direction signal IDS during the reset interval, may generate the first image comparison signal and the second comparison signal by delaying the second comparison signal CS2 by a second delay amount and a third delay amount, respectively, may select one of the first image comparison signal and the second comparison signal based on the and the interval direction signal IDS and the decision signal DS and may provide the selected one as the selected comparison signal SCS to the second latch circuit 250 during the image interval.

The second latch circuit 300 may provide all bits RG20~RG2$n$ of the second reset component data RSTG2 to the calculating circuit 400 through a signal line L1 during the reset interval and may provide all bits SG0~SGn of the image component data SIGG to the calculating circuit 400 through the signal line L1 during the image interval.

The calculating circuit 400 generates effective image data IMGB by subtracting the second reset component data RSTG2 from the image component data SIGG bit by bit and sequentially outputs the digital effective image data IMGB bit by bit through an output signal line OL. For example, the effective image data IMGB may be a (n+1)-bit binary code and may include a first bit IB0 through a (n+1)-th bit IBn. The calculating circuit 400 may sequentially perform a (bit-wise) Gray-to-binary conversion bit by bit.

The digital CDS circuit 100 according to example embodiments may sequentially latch the first reset component data RSTG1 and the second reset component data RSTG2 by a first delay amount and may determine a timing of latching the image component data SIGG based on determining the bit-wise identity of the first reset component data RSTG1 and the second reset component data RSTG2. That is, the decision circuit 300 may determine whether a timing of latching the first reset component data RSTG1 and a timing of latching the second reset component data RSTG2 correspond to the same cycle of a least significant bit (LSB) of the count signal GCNT.

Accordingly, the digital CDS circuit 100 may latch the image component data SIGG at a center of the LSB of the count signal GCNT, and may reduce quantization noise without increasing a number of bits of the count signal GCNT. In addition, the digital CDS circuit 100 may reduce column fixed pattern noise (CFPN) because the quantization noise between column lines CL1~CLk in a pixel array in FIG. 15 may be substantially similar even if positions of the column lines CL1~CLk vary.

Figure 2A:
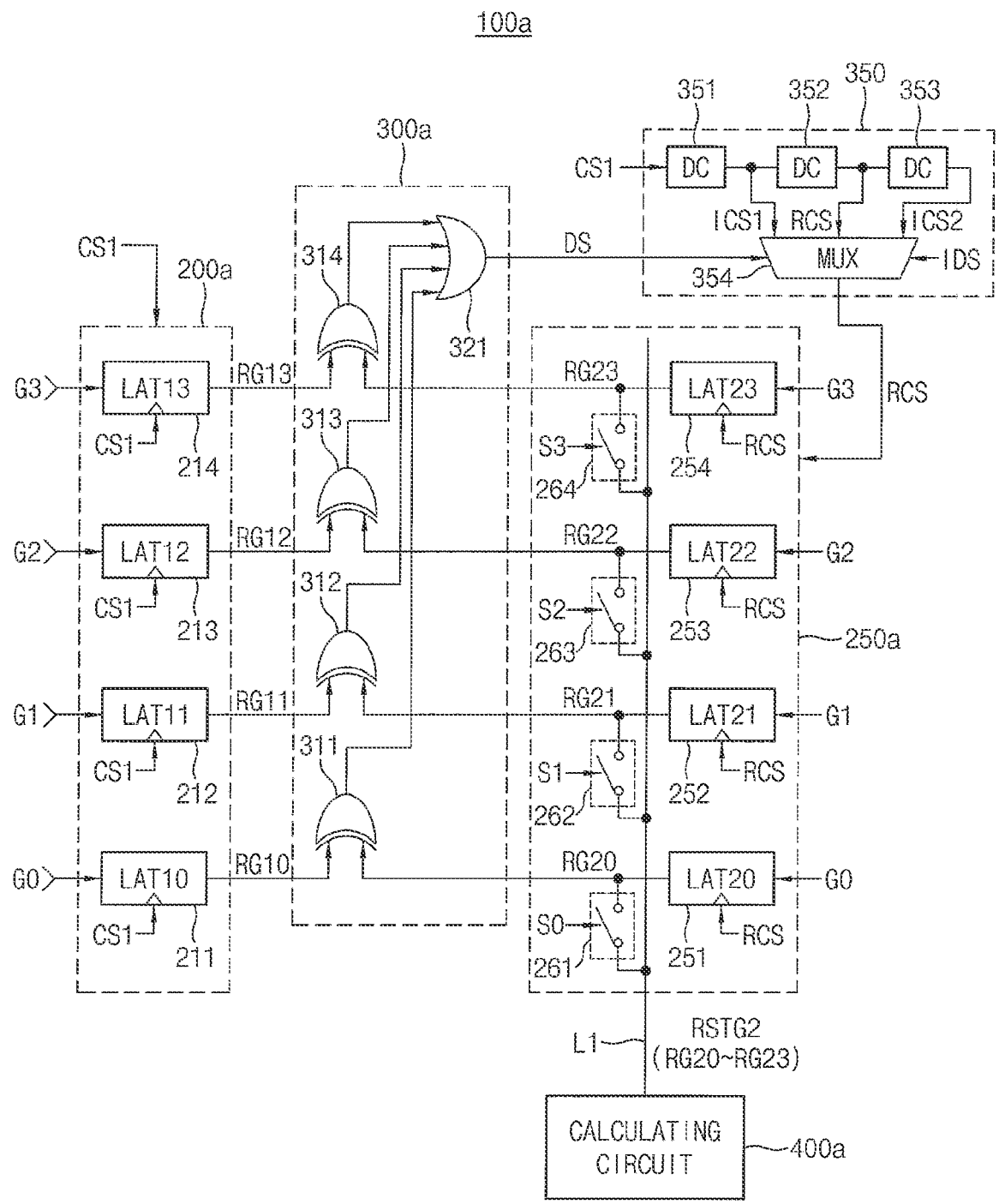
FIGS. 2A and 2B are diagrams illustrating examples of the digital CDS circuit of FIG. 1 during a reset interval and an image interval, respectively.
Figure 2B:
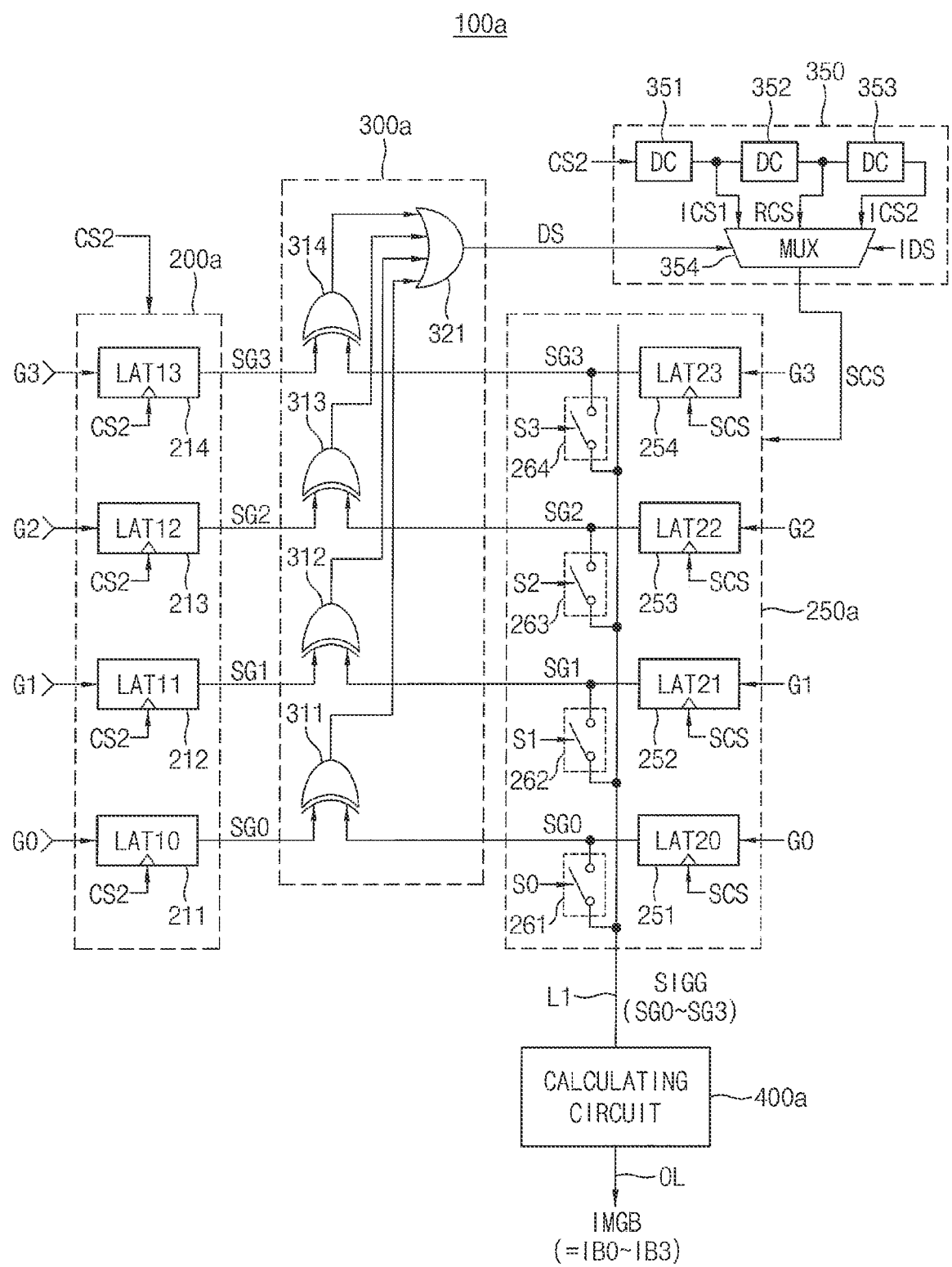

FIGS. 2A and 2B are diagrams illustrating examples of the digital CDS circuit of FIG. 1 during a reset interval and an image interval, respectively.

Referring to FIGS. 2A and 2B, a digital CDS circuit 100$a$ may include a first latch circuit 200$a$, a second latch circuit 250$a$, a decision circuit 300$a$, a delay control circuit 350 and a calculating circuit 400$a$.

For convenience of description, configurations and operations of the digital CDS circuit 100$a$ will be described based on 4-bit digital data. In other words, the digital CDS circuit 100$a$ in FIGS. 2A and 2B may generate 4-bit effective image data (e.g., a 4-bit binary code including bits IB0~IB3) based on 4-bit image component data (e.g., a 4-bit first Gray code including bits SG0~SG3) and 4-bit second reset component data (e.g., a 4-bit second Gray code including bits RG20~RG23).

Referring to FIG. 2A, the first latch circuit 200$a$ may include a plurality of first latches 211, 212, 213 and 214. Each of the plurality of first latches 211, 212, 213 and 214 may store a respective one of bits RG10, RG11, RG12 and RG13 of the first reset component data by latching a respective one of bits G0, G1, G2 and G3 of the count signal based on the first comparison signal CS1.

The second latch circuit 250$a$ may include a plurality of second latches 251, 252, 253 and 254 and a plurality of output switches 261, 262, 263 and 264. Each of the plurality of second latches 251, 252, 253 and 254 may store a respective one of bits RG20, RG21, RG22 and RG23 of the second reset component data by latching a respective one of bits G0, G1, G2 and G3 of the count signal based on the reset comparison signal RCS during the reset interval. The bits RG20, RG21, RG22 and RG23 of the second reset component data RSTG2 may be sequentially provided to the calculating circuit 400$a$ through the plurality of output switches 261, 262, 263 and 264.

The decision circuit 300$a$ may include a plurality of XOR gates 311, 312, 313 and 314 and an OR gate 321. Each of the plurality of XOR gates 311, 312, 313 and 314 may perform XOR operation on each of the bits RG10, RG11, RG12 and RG13 of the first reset component data and respective one of the bits RG20, RG21, RG22 and RG23 of the second reset component data. The OR gate 321 may output the decision signal DS to the delay control circuit 350 by performing an OR operation on outputs of the XOR gates 311, 312, 313 and 314.

The delay control circuit 350 may include a first delay cell (DC) 351, a second delay cell 352, a third delay cell 353 and a multiplexer (MUX) 354.

The first delay cell 351 may delay the first comparison signal CS1 by a unit delay amount to provide a first image comparison signal ICS1. The second delay cell 352 may delay an output of the first delay cell 351 by a unit delay amount to provide the reset comparison signal RCS. The third delay cell 353 may delay an output of the second delay cell 352 by the unit delay amount to provide a second image comparison signal ICS2. The multiplexer 354 may receive outputs of the first delay cell 351, the second delay cell 352 and the third delay cell 353 and may provide the second latch circuit 250*a* with the reset comparison signal RCS (i.e., the output of the second delay cell 352) based on the interval direction signal IDS and the decision signal DS during the reset interval. The unit delay amount may correspond to a quarter of one cycle of the LSB of the count signal GCNT. That is, the delay control circuit 350 may delay the first comparison signal CS1 by a first delay amount (corresponding to a half of one cycle of the LSB of the count signal GCNT) to provide the reset comparison signal RCS to the second latch circuit 250*a* during the reset interval.

The calculating circuit 400*a* may store the bits RG20, RG21, RG22 and RG23 of the second reset component data RSTG2.

Referring to FIG. 2B, each of the plurality of first latches 211, 212, 213 and 214 may store a respective one of bits SG0, SG1, SG2 and SG3 of the image component data by latching a respective one of bits G0, G1, G2 and G3 of the count signal based on the first comparison signal CS1 during the image interval.

During the image interval, the first delay cell 351 may delay the second comparison signal CS2 by the unit delay amount to provide the first image comparison signal ICS1. The second delay cell 352 may delay an output of the first delay cell 351 by the unit delay amount to provide the reset comparison signal RCS. The third delay cell 353 may delay an output of the second delay cell 352 by the unit delay amount to provide the second image comparison signal ICS2. The multiplexer 354 may receive outputs of the first delay cell 351, the second delay cell 352 and the third delay cell 353 and may provide the second latch circuit 250*a* with the first image comparison signal ICS1 and the second image comparison signal ICS2 based on the interval directions signal IDS and the decision signal DS during the image interval.

That is, the delay control circuit 350 may delay the second comparison signal CS2 by a second delay amount to generate the first image comparison signal ICS1 and may delay the second comparison signal CS2 by a third delay amount to generate the second image comparison signal ICS2. The second delay amount may correspond to a quarter of one cycle of the LSB of the count signal GCNT and the third delay amount may correspond to three quarters of one cycle of the LSB of the count signal GCNT.

When the decision signal DS indicates that corresponding bits of the first reset component data RSTG1 and the second reset component data RSTG2 match, the multiplexer 354 provides the second latch circuit 250*a* with the first image comparison signal ICS1 as the selected comparison signal SCS. When the decision signal DS indicates that at least one pair of corresponding bits of the first reset component data RSTG1 and the second reset component data RSTG2 does not match, the multiplexer 354 provides the second latch circuit 250*a* with the second image comparison signal ICS2 as the selected comparison signal SCS.

The second latch circuit 250*a* may store bits SG0, SG1, SG2 and SG3 of the image component data SIGG and provides the bits SG0, SG1, SG2 and SG3 of the image component data SIGG to the calculation circuit 400*a* through the signal line L1 by the plurality of output switches 261, 262, 263 and 264.

The calculating circuit 400*a* generates bits IB0~IB3 of the effective image data IMGB by subtracting each of the bits RG20, RG21, RG22 and RG23 of the second reset component data RSTG2 from respective one of the bits SG0, SG1, SG2 and SG3 of the image component data SIGG and sequentially outputs the bits IB0~IB3 of the effective image data IMGB through the output signal line OL.

Figure 3:
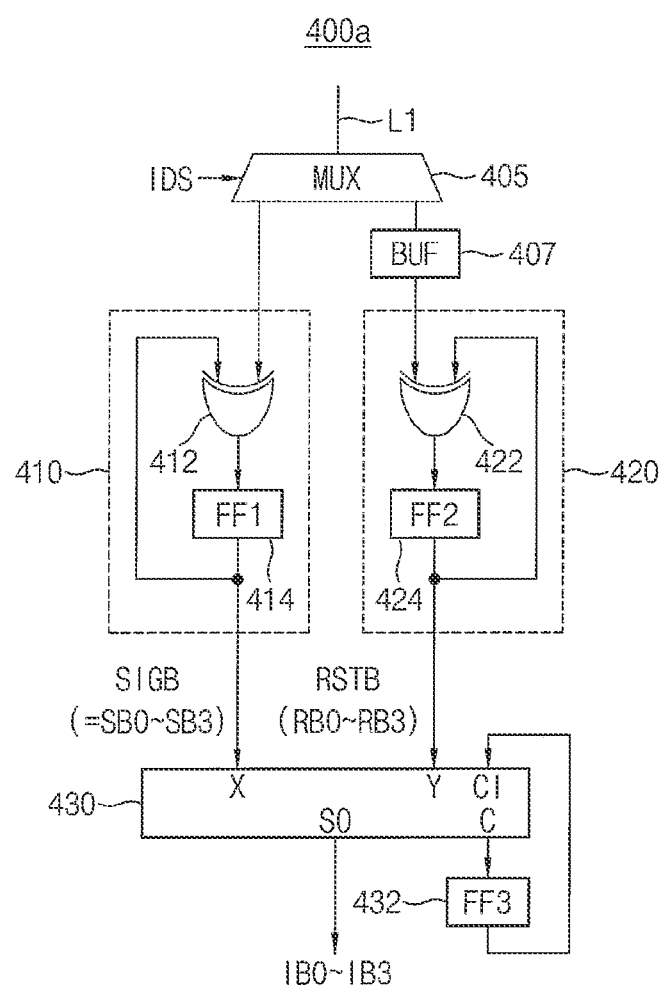
FIG. 3 is a circuit diagram illustrating an example of the calculating circuit in the digital CDS circuit of FIG. 1 according to example embodiments.

FIG. 3 is a circuit diagram illustrating an example of the calculating circuit in the digital CDS circuit of FIG. 1 according to example embodiments.

Referring to FIG. 3, the calculating circuit 400*a* may include a multiplexer 405, a buffer 407, a first Gray-to-binary converter 410, a second Gray-to-binary converter 420 and a full adder 430. The calculating circuit 400*a* may further include a flip-flop 432.

The multiplexer 405 may provide the buffer 407 with the second reset component data RSTG2 provided from the first signal line L1 during the reset period and may provide the first Gray-to-binary converter 410 with the image component data SIGG provided from the first signal line L1 during the image period, in response to the interval direction signal IDS. The buffer 407 may sequentially store the bits of the second reset component data RSTG2 and may sequentially provide the bits of the second reset component data RSTG2 to the second Gray-to-binary converter 420.

The first Gray-to-binary converter 410*a* may generate a first binary code SIGB by performing a Gray-to-binary conversion on the image component data bit by bit. The first binary code SIGB may be a 4-bit binary code corresponding to the image component data and may include a first bit SB0 through a fourth bit SB3.

The first Gray-to-binary converter 410 may include a first XOR gate 412 and a first flip-flop 414. The first XOR gate 412 may generate one of the bits SB0~SB3 of the first binary code SIGB by performing the XOR operation on one of the bits SG0, SG1, SG2 and SG3 of the image component data and an output of the first flip-flop 414. The first flip-flop 414 may store a first initial value at an initial operation time of the digital CDS circuit 100*a*, and then may sequentially store an output of the first XOR gate 412. For example, the first initial value may be "0."

The second Gray-to-binary converter 420 may generate a second binary code RSTB by performing the Gray-to-binary conversion and a complement conversion on the digital reset component data bit by bit. The second binary code RSTB may be a 4-bit binary code corresponding to a negative representation of the second reset component data and may include a first bit RB0 through a fourth bit RB3.

The second Gray-to-binary converter 420 may include a second XOR gate 422 and a second flip-flop 424. The second XOR gate 422 may generate one of the bits RB0~RB3 of the second binary code RSTB by performing the XOR operation on one of the bits RG20~RG23 of the second reset component data and an output of the second flip-flop 424. The second flip-flop 424 may store a second initial value at the initial operation time of the digital CDS circuit 100*a*, and then may sequentially store an output of the second XOR gate 422. To perform the complement conversion, the second initial value may be different from the first initial value. For example, the second initial value may be "1."

The full adder 430 may generate the effective image data by adding the first binary code SIGB and the second binary code RSTB bit by bit. For example, the full adder 430 may include a first input terminal X receiving the bits SB0~SB3 of the first binary code SIGB, a second input terminal Y receiving the bits RB0~RB3 of the second binary code RSTB, a third input terminal CI receiving an output of the flip-flop 432, a first output terminal S0 outputting the bits IB0~IB3 of the effective image data and a second output terminal C outputting a carry. The flip-flop 432 may store the carry output from the second output terminal C of the full adder 430.

The calculating circuit 400a may sequentially generate the bits SB0~SB3 of the first binary code SIGB based on the bits SG0~SG3 of the image component data (a first Gray code), may sequentially generate the bits RB0~RB3 of the second binary code RSTB based on the bits RG20~RG23 of the second reset component data (a second Gray code), and may generate the bits IB0~IB3 of the effective image data by sequentially adding the bits SB0~SB3 of the first binary code SIGB and the bits RB0~RB3 of the second binary code RSTB.

Figure 4:
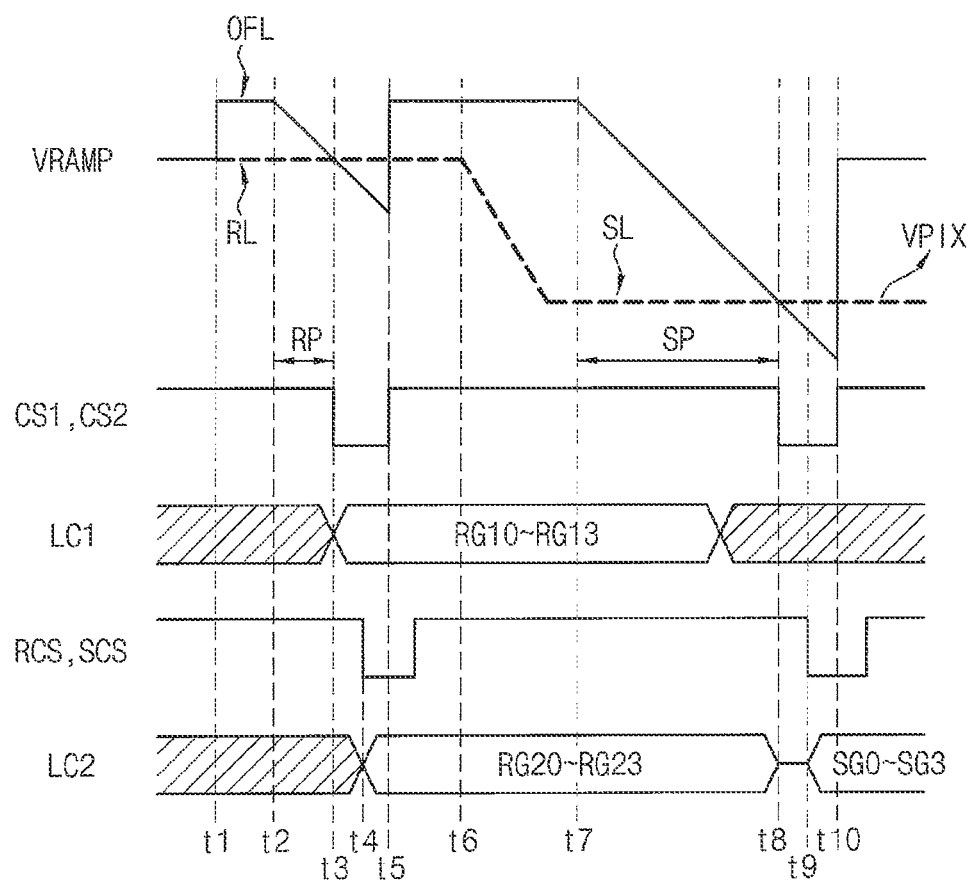
FIGS. 4 and 5 are timing diagrams for describing an operation of the digital CDS circuit of FIGS. 2A and 2B.
Figure 5:
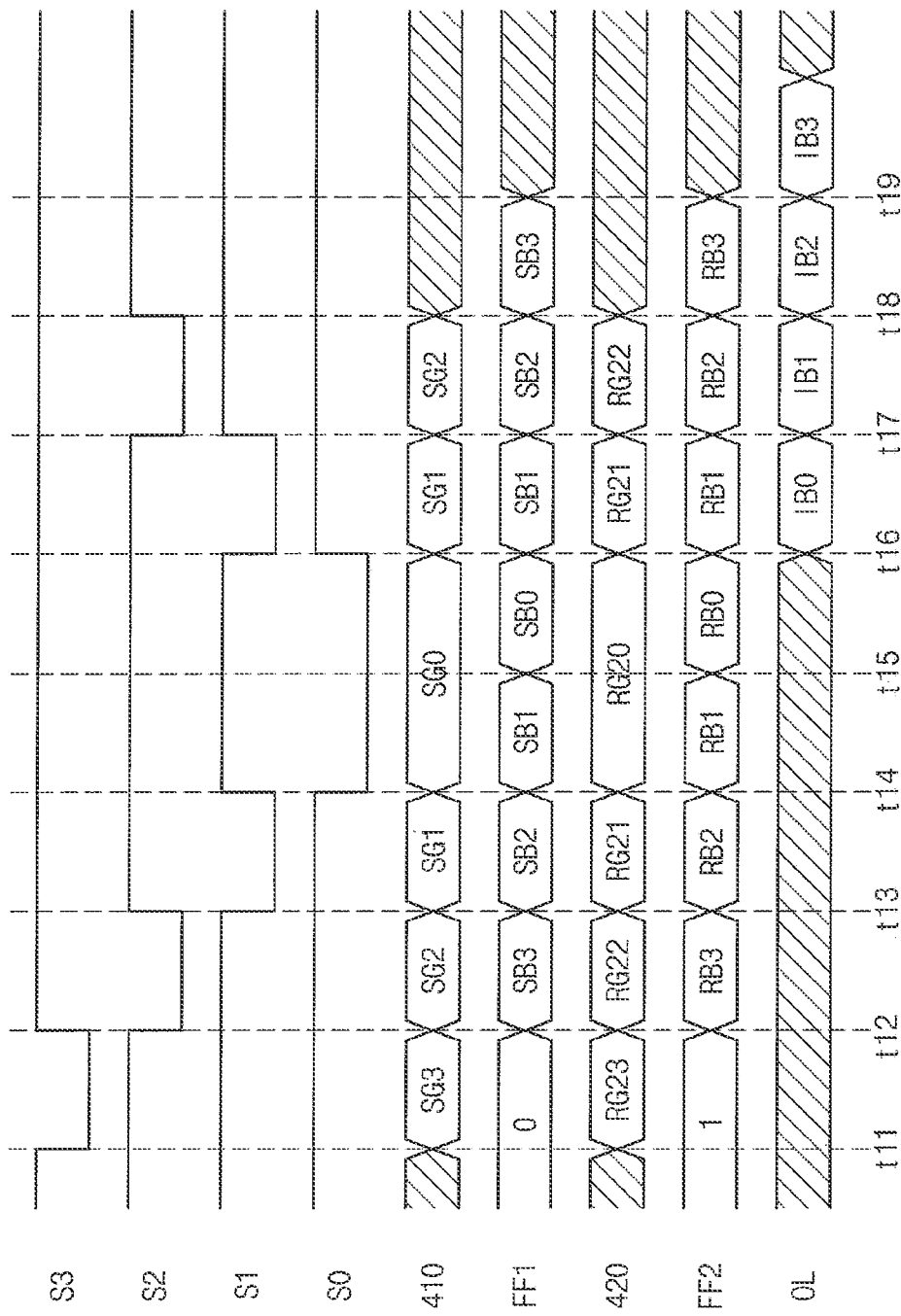

FIGS. 4 and 5 are timing diagrams for describing an operation of the digital CDS circuit of FIGS. 2A and 2B.

FIG. 4 illustrates that the bits SG0~SG3 of the first Gray code and the bits RG20~RG23 of the second Gray code are stored in the second latch circuit 250a in FIGS. 2A and 2B. In FIG. 4, LC1 represents types of codes stored in the first latch circuit 200a in FIGS. 2A and 2B, and LC2 represents types of codes stored in the second latch circuit 250a in FIGS. 2A and 2B. FIG. 5 illustrates that the calculating circuit 400a in FIG. 3 generates the bits IB0~IB3 of the effective image data based on the bits SG0~SG3 of the first Gray code and the bits RG20~RG23 of the second Gray code. In FIG. 5, FF1 represents types of bits stored in the first flip-flop 414 in FIG. 3, and FF2 represents types of bits stored in the second flip-flop 424 in FIG. 3.

Hereinafter, the operation of the digital CDS circuit 100a according to example embodiments will be described in detail with reference to FIGS. 2A through 5.

As illustrated in FIG. 4, at time t1, an analog pixel signal VPIX has a reset level RL, and a ramp signal VRAMP has an offset level OFL that is higher than the reset level RL by a predetermined value. As will be described with reference to FIGS. 15 and 16, the ramp signal VRAMP may be generated from a voltage generator (e.g., 560 in FIG. 15) included in an image sensor, and the analog pixel signal VPIX may be generated from a pixel array (e.g., 510 in FIG. 1) included in the image sensor. The analog pixel signal VPIX may include a reset component and an image component. The reset level RL may correspond to a reset component of the analog pixel signal VPIX.

At time t2, the ramp signal VRAMP is activated and is decreased from the offset level OFL with a constant slope. The count signal applied to the first latch circuit 200a may have (e.g., maintain) an initial value until time t2, and may be sequentially increased by a predetermined value (e.g., by "1") from time t2.

During a first comparison interval from time t2 to time t5, a time point at which the first comparison signal CS1 is transitioned is determined by comparing the activated ramp signal VRAMP with the analog pixel signal VPIX. During an interval from time t3 to time t5, the first comparison signal CS1 is transitioned from a logic high level to a logic low level at time t3. In addition, at time t3, the first latch circuit 200a latches a first value of the count signal based on the first comparison signal CS1, and the bits RG10~RG13 of the Gray code corresponding to the first reset component data are stored in the plurality of first latches 211, 212, 213 and 214. A value of the second Gray code may correspond to a length of a reset counting interval RP.

At time t4, the reset comparison signal RCS is transitioned from the logic high level to the logic low level. The second latch circuit 250a latches the count signal based on the reset comparison signal RCS and the bits RG20~RG23 of the second Gray code corresponding to the second reset component data are stored in the plurality of second latches 251, 252, 253 and 254. The bits RG20~RG23 of the second Gray code are provided to the calculating circuit 400a.

At time t5, the ramp signal VRAMP is deactivated and has the offset level OFL again. At time t6, photo-charges collected by a photoelectric conversion unit (e.g., 610 in FIG. 16) included in the image sensor are transferred to a floating diffusion node (e.g., 630 in FIG. 16) included in the image sensor, and the level of the analog pixel signal VPIX is changed from the reset level RL to an image level SL. The image level SL may correspond to an image component of the analog pixel signal VPIX.

At time t7, the ramp signal VRAMP is activated again and is decreased from the offset level OFL with the constant slope.

During a second comparison interval from time t7 to time t9, another time point at which the second comparison signal CS2 is transitioned is determined by comparing the activated ramp signal VRAMP with the analog pixel signal VPIX. During an interval from time t8 to time t9, the second comparison signal CS2 is transitioned from the logic high level to the logic low level at time t8.

In addition, at time t9, the second latch circuit 250a latches the value of the count signal based the selected comparison signal SCS obtained by delaying the second comparison signal CS2, and the bits SG0~SG3 of the first Gray code corresponding to the image component data are stored in the plurality of second latches 251, 252, 253 and 254. A value of the first Gray code may correspond to a length of an image counting interval SP. The bits SG0~SG3 of the first Gray code are provided to the calculating circuit 400a.

The full adder 430 may sequentially receive the first and second binary codes SIGB and RSTB in an order from LSBs to most significant bits (MSBs).

For example, as illustrated in FIG. 5, at time t11 after time t10, a fourth switch control signal S3 is activated by transitioning from the logic high level to the logic low level. The first latch circuit 200a outputs the fourth bit SG3 of the first Gray-to-binary converter 410. The first XOR gate 412 performs the XOR operation on the fourth bit SG3 of the first Gray code and the first initial value (e.g., "0") stored in the first flip-flop 414, and generates the fourth bit SB3 of the first binary code. The fourth bit SB3 of the first binary code SIGB may be substantially the same as the fourth bit SG3 of the first Gray code.

At time t12, the fourth bit SB3 of the first binary code output from the first XOR gate 412 is stored in the first flip-flop 414, the fourth switch control signal S3 is deactivated, and the third switch control signal S2 is activated. The first latch circuit 200a outputs the third bit SG2 of the first Gray code to the first Gray-to-binary converter 410. The first XOR gate 412 performs the XOR operation on the third bit SG2 of the first Gray code and the fourth bit SB3 of the first binary code stored in the first flip-flop 414, and generates the third bit SB2 of the first binary code. Similarly, the first XOR gate 412 generates the second bit SB1 of the first binary code at time t13.

At time t13, the third bit SB2 of the first binary code SIGB output from the first XOR gate 412 is stored in the first flip-flop 414, the third switch control signal S2 is deactivated by transitioning from the logic low level to the logic high level, and the second switch control signal S1 is activated by transitioning from the logic high level to the logic low level. The first latch circuit 200a outputs the second bit SG1 of the first Gray code through the first signal line L1 based on the second switch control signal S1. The first XOR gate 412 performs the XOR operation on the second bit SG1 of the first Gray code and the third bit SB2 of the first binary code SIGB stored in the first flip-flop 414, and generates the second bit SB1 of the first binary code SIGB based on the Equation 3.

At time t14, the second bit SB1 of the first binary code SIGB output from the first XOR gate 412 is stored in the first flip-flop 414, the second switch control signal S1 is deactivated by transitioning from the logic low level to the logic high level, and the first switch control signal S0 is activated by transitioning from the logic high level to the logic low level. The first latch circuit 200a outputs the first bit SG0 of the first Gray code through the first signal line L1 based on the first switch control signal S0. The first XOR gate 412 performs the XOR operation on the first bit SG0 of the first Gray code and the second bit SB1 of the first binary code SIGB stored in the first flip-flop 414, and generates the first bit SB0 of the first binary code SIGB based on the Equation 4.

At time t15, the first switch control signal S0 is maintained at an activated state, the first XOR gate 412 performs the XOR operation on the first bit SG0 of the first Gray code and the first bit SB0 of the first binary code stored in the first flip-flop 414, and generates the second bit SB1 of the first binary code.

Similarly, at time t16, the first XOR gate 412 generates the third bit SB2 of the first binary code and generates the fourth bit SB3 of the first binary code at time t17. At time t18, the fourth bit SB3 of the first binary code output from the first XOR gate 412 is stored in the first flip-flop 414.

Similarly, at time t11, the second XOR gate 422 performs the XOR operation on the fourth bit RG23 of the second Gray code and the second initial value (e.g., "1") stored in the second flip-flop 424, and generates the fourth bit RB3 of the second binary code. At time t12, the second XOR gate 422 generates the third bit RB2 of the second binary code In addition, at time t15, the full adder 430 generates the first bit IB0 of the effective image data based on the first bit SB0 of the first binary code stored in the first flip-flop 414 and the first bit RB0 of the second binary code stored in the second flip-flop 424. Similarly, the full adder 430 generates the second bit IB1 of the effective image data, the third bit IB2 of the effective image data and the fourth bit IB3 of the effective image data at times t16, t17 and t18, respectively.

FIG. 6 illustrates various signals of the delay control circuit in FIGS. 2A and 2B during reset interval and image interval.

Referring to FIGS. 2A, 2B and 6, the multiplexer 354 may provide the second latch circuit 250a with the reset comparison signal RCS (i.e., the output of the second delay cell 352) based on the interval direction signal IDS during the reset interval because the interval direction signal IDS has a high level during the reset interval.

The interval direction signal IDS has a low level during the image interval. When the direction signal DS has a low level indicating that corresponding bits of the first reset component data RSTG1 and the second reset component data RSTG2 match, the multiplexer 354 may provide the second latch circuit 250a with the first image comparison signal ICS1 (i.e., the output of the first delay cell 351) as the selected comparison signal SCS based on the interval direction signal IDS and the decision signal DS. When the direction signal DS has a high level indicating that at least one of corresponding bits of the first reset component data RSTG1 and the second reset component data RSTG2 does not match, the multiplexer 354 may provide the second latch circuit 250a with the second image comparison signal ICS2 (i.e., the output of the third delay cell 353) as the selected comparison signal SCS based on the interval direction signal IDS and the decision signal DS.

Figure 7A:
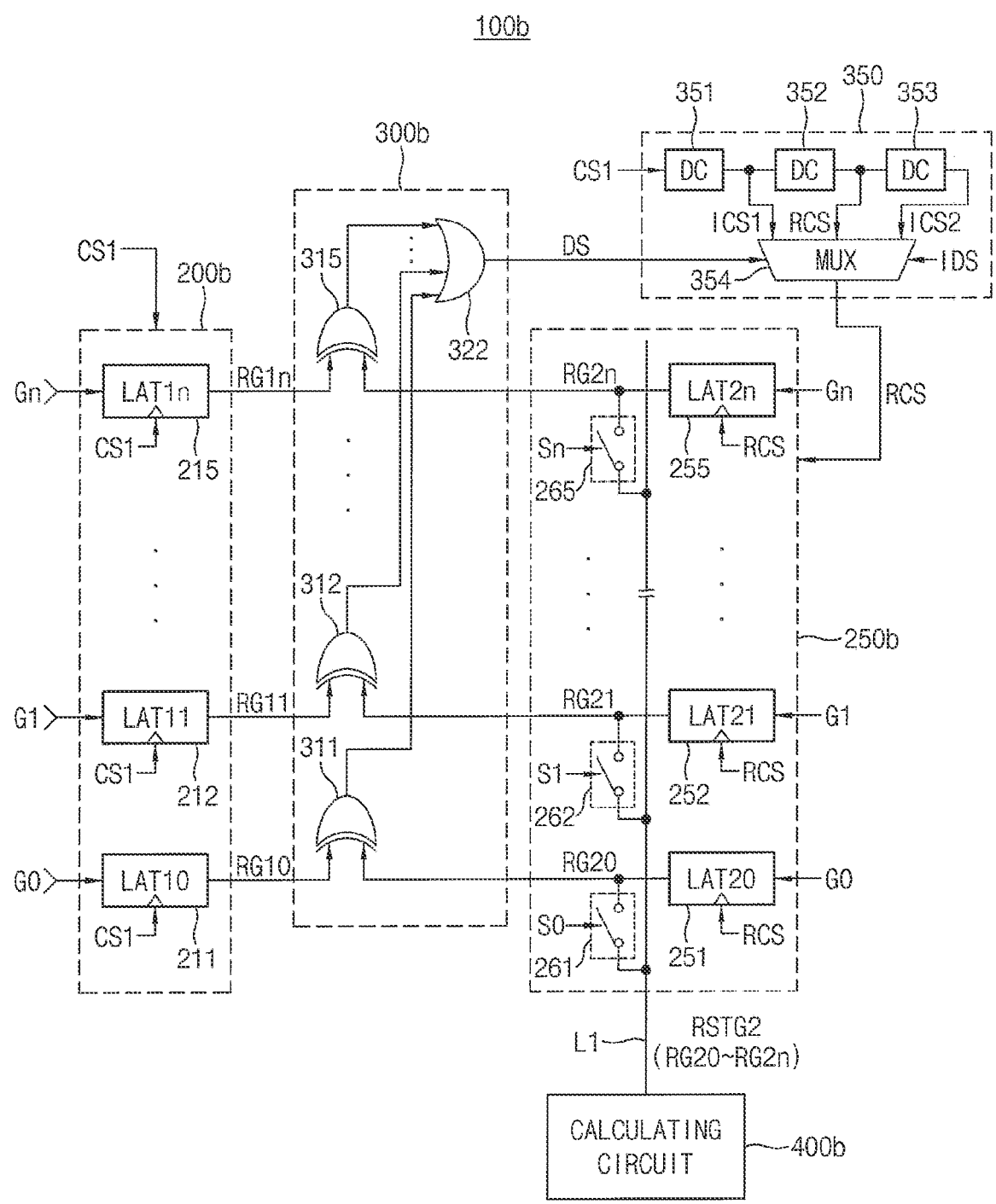
FIGS. 7A and 7B are diagrams illustrating other examples of the digital CDS circuit of FIG. 1 during a reset interval and an image interval, respectively.
Figure 7B:
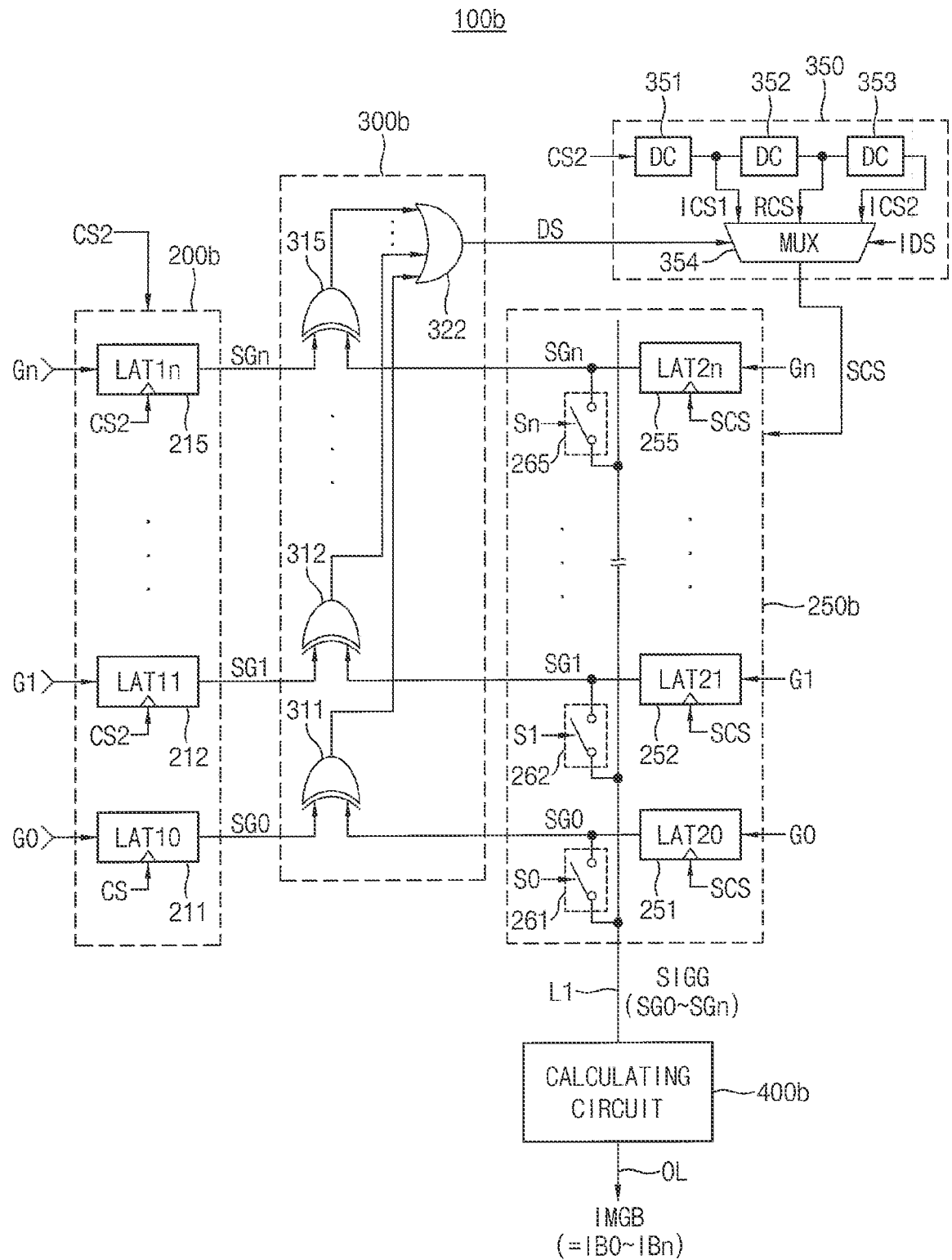

FIGS. 7A and 7B are diagrams illustrating other examples of the digital CDS circuit of FIG. 1 during a reset interval and an image interval, respectively.

Referring to FIGS. 7A and 7B, a digital CDS circuit 100b may include a first latch circuit 200b, a second latch circuit 250b, a decision circuit 300b, a delay control circuit 350 and a calculating circuit 400b.

The digital CDS circuit 100b of FIGS. 7A and 7B may be similar to the digital CDS circuit 100a of FIGS. 2A and 2B, except that the digital CDS circuit 100b of FIGS. 7A and 7B generates (n+1)-bit effective image data (e.g., a (n+1)-bit binary code including bits IB0~IBn) based on (n+1)-bit image component data (e.g., a (n+1)-bit first Gray code including bits SG0, SG1, ..., SGn) and (n+1)-bit second reset component data (e.g., a (n+1)-bit second Gray code including bits RG20, RG21, ..., RG2n).

The first latch circuit 200b may include a plurality of first latches 211, 212, ..., 215. Each of the plurality of first latches 211, 212, ..., 215 may store a respective one of bits RG10, RG11, ..., RG1n of the first reset component data by latching a respective one of bits G0, G1, ..., Gn of the count signal based on the first comparison signal CS1.

The second latch circuit 250b may include a plurality of second latches 251, 252, ..., 255 and a plurality of output switches 261, 262, ..., 265. Each of the plurality of second latches 251, 252, ..., 255 may store a respective one of bits RG20, RG21, ..., RG2n of the second reset component data by latching a respective one of bits G0, G1, ..., Gn of the count signal based on the reset comparison signal RCS during the reset interval. The plurality of output switches 261, 262, ..., 265 may selectively connect an output terminal of one of the second latches 251, 252, ..., 255 to the first signal line L1 coupled to the calculating circuit 400b in response to respective one of switch control signals S0, S1, ..., Sn. The bits RG20, RG21, ..., RG2n of the second reset component data RSTG2 may be sequentially provided to the calculating circuit 400b through the plurality of output switches 261, 262, ..., 265.

The decision circuit 300b may include a plurality of XOR gates 311, 312, ..., 315 and an OR gate 322. Each of the plurality of XOR gates 311, 312, ..., 315 may perform an XOR operation on each of the bits RG10, RG11, ..., RG1n of the first reset component data and a respective one of the bits RG20, RG21, ..., RG2n of the second reset component data. The OR gate 322 may output the decision signal DS to the delay control circuit 350 by performing an OR operation on outputs of the XOR gates 311, 312, ..., 315.

The calculating circuit 400b may store the bits RG20, RG21, ..., RG2n of the second reset component data.

Referring to FIG. 7B, an operation of the first latch circuit 200b and an operation of the delay control circuit 350 during the image interval may be substantially similar to the operation of the first latch circuit 200a and an operation of the delay control circuit 350 in FIG. 2B, respectively. The second latch circuit 250b may store bits SG0, SG1, ..., SGn of the image component data SIGG, and may provide the bits SG0, SG1, ..., SGn of the image component data SIGG to the calculation circuit 400b through the signal line L1 by the plurality of output switches 261, 262, ..., 265.

The calculating circuit 400b generates bits IB0~IBn of the effective image data IMGB by subtracting each of the bits RG20, RG21, ..., RG2n of the second reset component data RSTG2 from respective one of the bits SG0, SG1, ..., SGn of the image component data SIGG and sequentially outputs the bits IB0~IBn of the effective image data IMGB through the output signal line OL.

Figure 8:
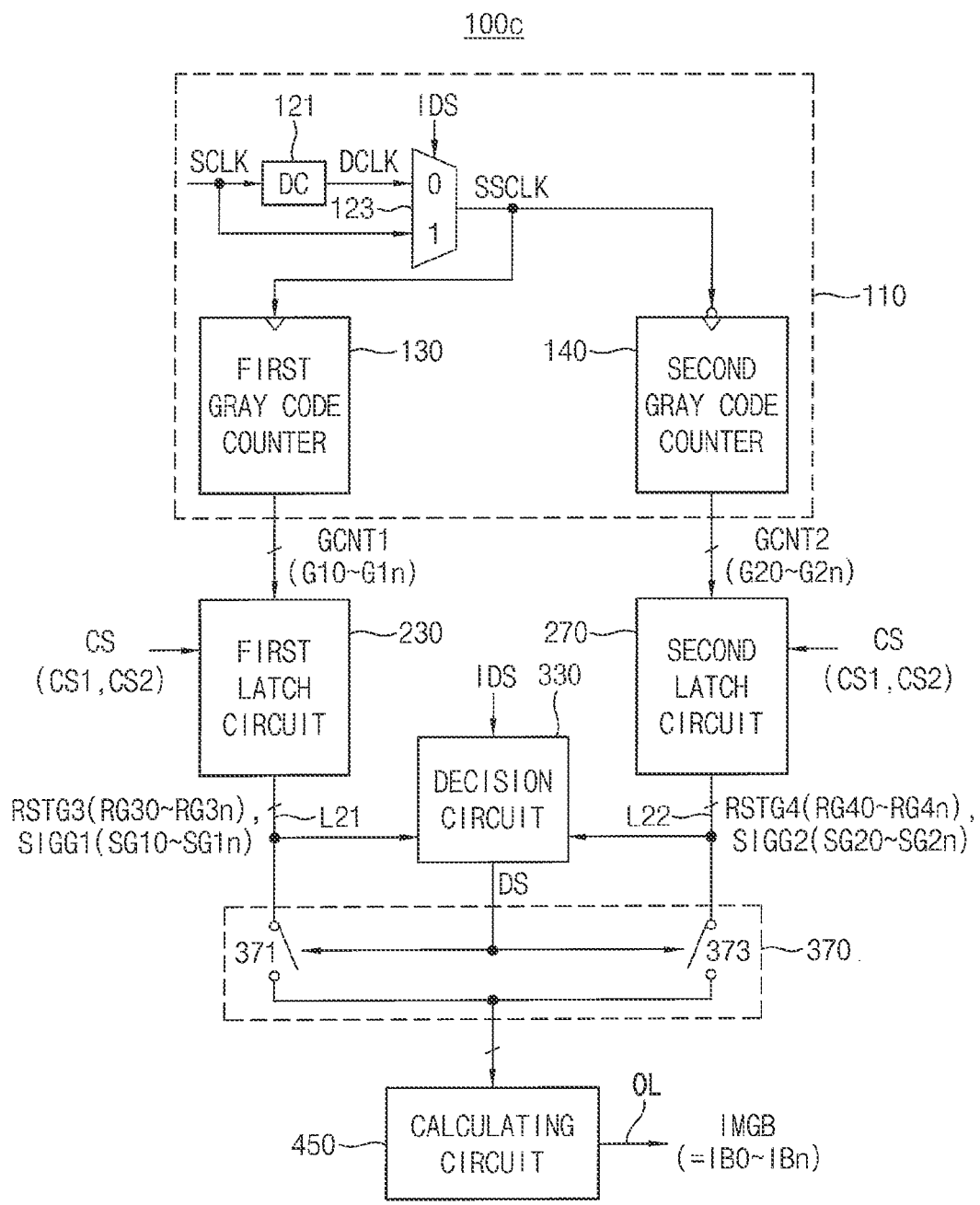
FIG. 8 is a block diagram illustrating a digital CDS circuit according to example embodiments.

FIG. 8 is a block diagram illustrating a digital CDS circuit according to example embodiments.

Referring to FIG. 8, the digital CDS circuit 100c may include a counter circuit 110, a first latch circuit 230, a second latch circuit 270, a decision circuit 330, a switch circuit 370 and a calculating circuit 450.

The counter circuit 110 may include a delay cell 121, a multiplexer 123, a first Gray code counter 130 and a second Gray code counter 140.

The delay cell 121 delays the counter clock signal SCLK by a unit delay amount to output a delayed clock signal DCLK. The multiplexer 123 may select one of the counter clock signal SCLK and the delayed clock signal DCLK based on the interval direction signal IDS to provide the selected one as a selected clock signal SSCLK. The multiplexer 123 may select the counter clock signal SCLK in response to the interval direction signal IDS during the reset interval and may select the delayed clock signal DCLK in response to the interval direction signal IDS during the image interval.

The first Gray code counter 130 may output a first count signal GCNT1 based on a rising edge of the selected clock signal SSCLK and the second Gray code counter 140 may output a second count signal GCNT2 based on a falling edge of the selected clock signal SSCLK. Each of the first count signal GCNT1 and the second count signal GCNT2 may be a (n+1)-bit Gray code, the first count signal GCNT1 may include a first bit G10 through a (n+1)-th bit G1n and the second count signal GCNT2 may include a first bit G20 through a (n+1)-th bit G2n. Each of the first count signal GCNT1 and the second count signal GCNT2 may have a sequentially increased value.

The first latch circuit 230 may store a first reset component data RSTG3 by latching the first count signal GCNT1 based on a first comparison signal CS1 during the reset interval and may store a first image component data SIGG1 by latching the first count signal GCNT1 based on a second comparison signal CS2 during the image interval. The second latch circuit 270 may store a second reset component data RSTG4 by latching the second count signal GCNT2 based on the first comparison signal CS1 during the reset interval and may store a second image component data SIGG2 by latching the second count signal GCNT2 based on the second comparison signal CS2 during the image interval. The first comparison signal CS1 may denote a comparison signal CS during the reset interval and the second comparison signal CS2 may denote a comparison signal CS during the image interval.

The first reset component data RSTG3: (1) may be a Gray code that is one of the values of the first count signal GCNT1, (2) corresponds to a reset component of the analog pixel signal, and (3) may include first bit RG30 through (n+1)-th bit RG3n. The first image component data SIGG1: (1) may be a Gray code that is another one of the values of the first count signal GCNT1, (2) corresponds to an image component of the analog pixel signal, and (3) may include first bit SG10 through (n+1)-th bit SG1n. The second reset component data RSTG4: (1) may be a Gray code that is one of the values of the second count signal GCNT2, (2) corresponds to a reset component of the analog pixel signal, and (3) may include first bit RG40 through (n+1)-th bit RG4n. The second image component data SIGG2: (1) may be a Gray code that is another one of the values of the second count signal GCNT2, (2) corresponds to an image component of the analog pixel signal, and (3) may include first bit SG20 through (n+1)-th bit SG2n.

During the reset interval, the decision circuit 330 receives the first reset component data RSTG3 and the second reset component data RSTG4 and outputs the decision signal DS based on the interval direction signal IDS. During the image interval, the decision circuit 330 receives the first image component data SIGG1 and the second image component data SIGG2 and outputs the decision signal DS based on the interval direction signal IDS and a bitwise identity of the first image component data SIGG1 and the second image component data SIGG2.

The switch circuit 370 is connected to the first latch circuit 230 through a first signal line L21, is connected to the second latch circuit 270 through a second signal line L22, outputs the second reset component data RSTG4 during the reset interval based on the decision signal DS during the reset interval and outputs one of the first image component data SIGG1 and the second image component data SIGG2 as a selected image component data SSIGG during the image interval based on the decision signal DS.

The switch circuit 370 may include a first switch 371 connected to the first signal line L21 and the calculating circuit 450 and the second switch 373 connected to the second signal line L22 and the calculating circuit 450. The first switch 371 may selectively connect the first signal line L21 to the calculating circuit 450 in response to the decision signal DS and the second switch 373 may selectively connect the second signal line L22 to the calculating circuit 450 in response to the decision signal DS.

The calculating circuit 450 may receive the second image component data RSTG4 to store the second image component data RSTG4 during the reset interval, may generate effective image data IMGB by subtracting the second reset component data RSTG4 from the selected image component data SSIGG bit by bit during the image interval, and sequentially outputs the digital effective image data IMGB bit by bit through an output signal line OL. For example, the effective image data IMGB may be a (n+1)-bit binary code and may include a first bit IB0 through a (n+1)-th bit IBn. The calculating circuit 450 may sequentially perform a (bit-wise) Gray-to-binary conversion.

Figure 9A:
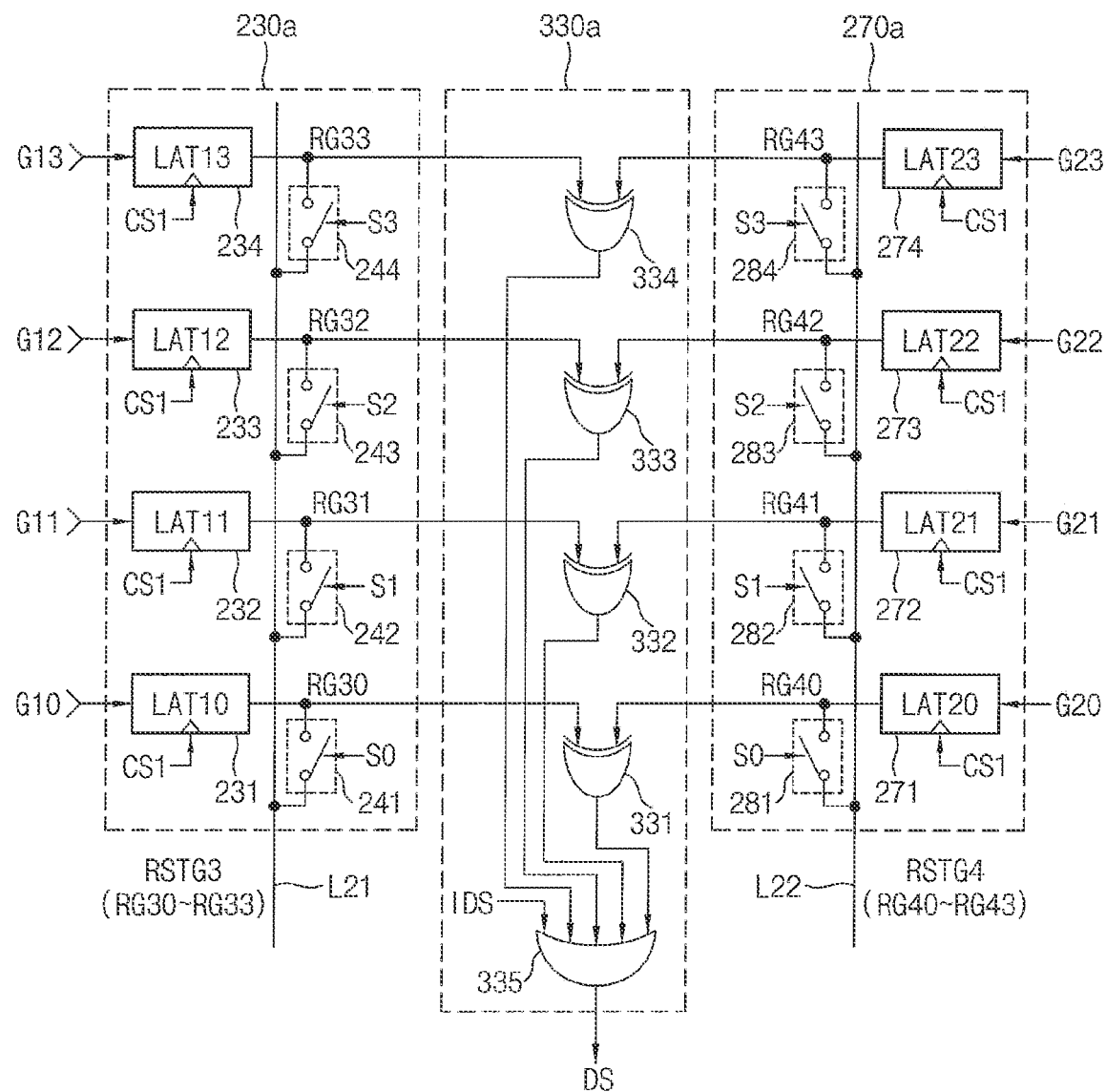
FIGS. 9A and 9B are diagrams illustrating examples of the digital CDS circuit of FIG. 8 during a reset interval and an image interval, respectively.
Figure 9B:
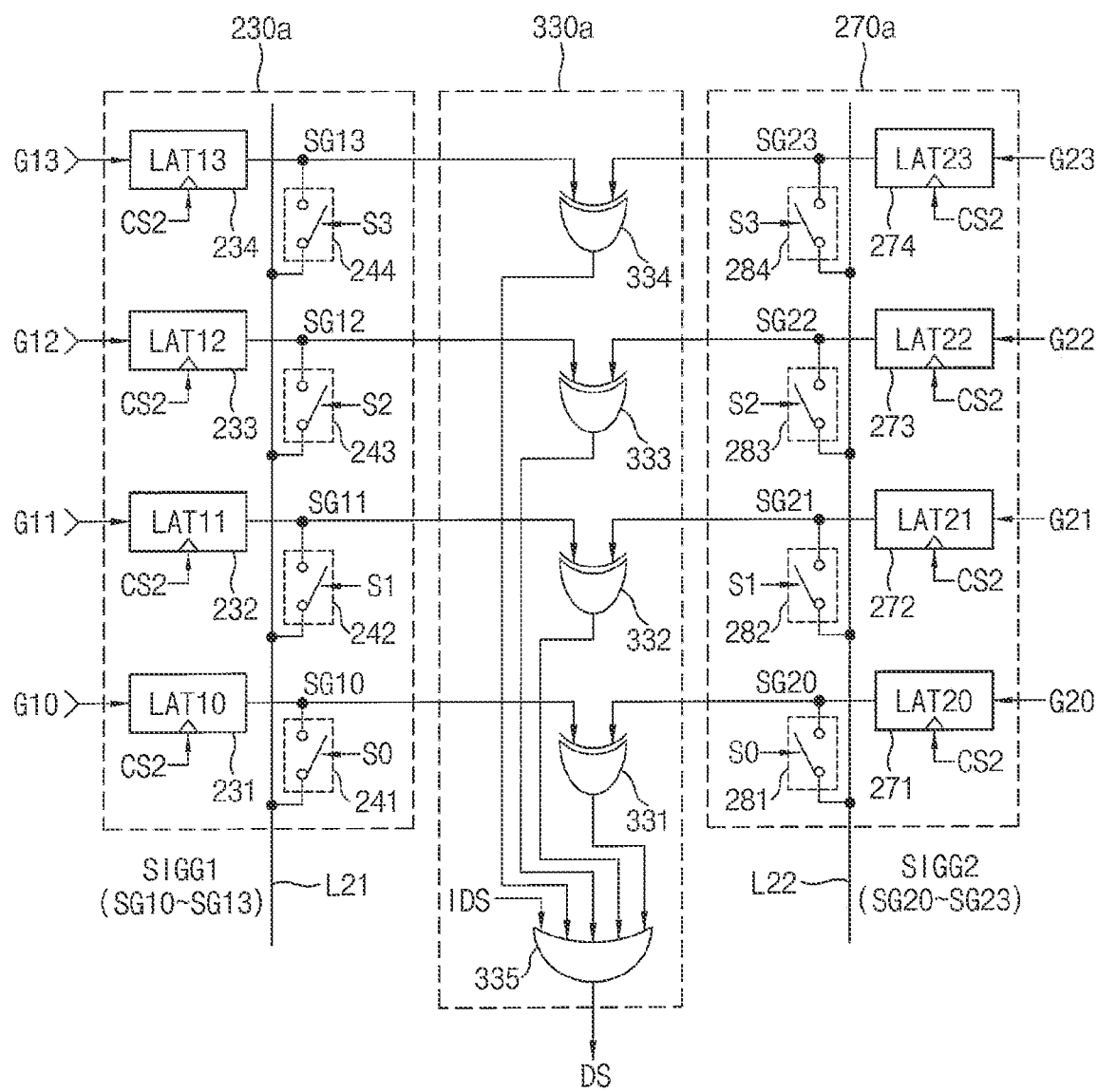

FIGS. 9A and 9B are diagrams illustrating examples of the digital CDS circuit of FIG. 8 during a reset interval and an image interval, respectively.

Referring to FIGS. 9A and 9B, a digital CDS circuit 100c of FIG. 8 is illustrated as including a first latch circuit 230a, a second latch circuit 270a and a decision circuit 330a. For convenience of description, configurations and operations of the digital CDS circuit 100c in FIG. 8 will be described based on 4-bit digital data. In other words, the digital CDS circuit 100c in FIG. 8 may generate 4-bit effective image data (e.g., a 4-bit binary code including bits IB0~IB3) based on 4-bit image component data (e.g., a 4-bit first Gray code including bits SG10~SG13 or SG20~SG23) and 4-bit reset component data (e.g., a 4-bit second Gray code including bits RG30~RG33 or RG40~RG43).

Referring to FIGS. 9A and 9B, the first latch circuit 230a may include a plurality of first latches 231, 232, 233 and 234 and a plurality of first output switches 241, 242, 243 and 244.

Referring to FIG. 9A, each of the plurality of first latches 231, 232, 233 and 234 may store a respective one of bits RG30, RG31, RG32 and RG33 of the first reset component data by latching a respective one of bits G10, G11, G12 and G13 of the first count signal based on the first comparison signal CS1 during the reset interval. Each of the plurality of first output switches 241, 242, 243 and 244 may selectively connect one of output terminals of the of first latches 231, 232, 233 and 234 to the first signal line L21 based on respective one of switch control signals S0, S1, S2 and S3. The bits RG30, RG31, RG32 and RG33 of the first reset component data may be sequentially provided to the switch circuit 370 through the first output switches 241, 242, 243 and 244.

The second latch circuit 270a may include a plurality of second latches 271, 272, 273 and 234 and a plurality of second output switches 281, 282, 283 and 284. Each of the plurality of second latches 271, 272, 273 and 274 may store a respective one of bits RG40, RG41, RG42 and RG43 of the second reset component data by latching a respective one of bits G20, G21, G22 and G23 of the second count signal based on the first comparison signal CS1 during the reset interval. Each of the plurality of second output switches 281, 282, 283 and 284 may selectively connect one of output terminals of the of second latches 271, 272, 273 and 274 to the second signal line L22 based on respective one of the switch control signals S0, S1, S2 and S3. The bits RG40, RG41, RG42 and RG43 of the second reset component data may be sequentially provided to the switch circuit 370 through the second output switches 281, 282, 283 and 284.

Referring to FIG. 9B, each of the plurality of first latches 231, 232, 233 and 234 may store a respective one of bits SG10, SG11, G12 and SG13 of the first image component data by latching a respective one of bits G10, G11, G22 and G13 of the first count signal based on the first comparison signal CS2 during the image interval. Each of the plurality of first output switches 241, 242, 243 and 244 may selectively connect one of output terminals of the of first latches 231, 232, 233 and 234 to the first signal line L21 based on respective one of switch control signals S0, S1, S2 and S3. The bits SG10, SG11, SG12 and SG13 of the first image component data may be sequentially provided to the switch circuit 370 through the first output switches 241, 242, 243 and 244.

Each of the plurality of second latches 271, 272, 273 and 274 may store a respective one of bits SG20, SG21, SG22 and SG23 of the second image component data by latching a respective one of bits G20, G21, G22 and G23 of the second count signal based on the second comparison signal CS2 during the image interval. Each of the plurality of second output switches 281, 282, 283 and 284 may selectively connect one of output terminals of the second latches 271, 272, 273 and 274 to the second signal line L22 based on respective one of the switch control signals S0, S1, S2 and S3. The bits SG20, SG21, SG22 and SG23 of the second image component data may be sequentially provided to the switch circuit 370 through the second output switches 281, 282, 283 and 284.

The decision circuit 330a may include a plurality of XOR gates 331, 332, 333 and 334 and an OR gate 335. Each of the plurality of XOR gates 331, 332, 333 and 334 may perform an XOR operation on each of the bits SG10, SG11, SG12 and SG13 of the first image component data and respective one of the bits SG20, SG21, SG22 and SG23 of the second image component data. The OR gate 335 may output the decision signal DS to the switch circuit 370 by performing an OR operation on outputs of the XOR gates 331, 332, 333 and 334 and the interval direction signal IDS.

Since the interval direction signal IDS has a high level and the decision signal DS has a high level during the reset interval, the switch circuit 370 provides the calculating circuit 450 with the bits RG40, RG41, RG42 and RG43 of the second reset component data provided from the second latch circuit 270a. Since the interval direction signal IDS has a low level during the image interval, the OR gate 355 may determine a logic level of the decision signal DS based on the outputs of the XOR gates 331, 332, 333 and 334. When the outputs of the XOR gates 331, 332, 333 and 334 correspond to low levels because each of the bits SG10, SG11, SG12 and SG13 of the first image component data matches respective one of the bits SG20, SG21, SG22 and SG23 of the second image component data, the OR gate 335 outputs the decision signal DS having a low level and the switch circuit 370 provides the calculating circuit 450 with the bits SG10, SG11, SG12 and SG13 of the first image component data provided from the first latch circuit 230a.

When at least one of the outputs of the XOR gates 331, 332, 333 and 334 correspond to a high level because at least one of the bits SG10, SG11, SG12 and SG13 of the first image component data does not match respective one of the bits SG20, SG21, SG22 and SG23 of the second image component data, the OR gate 335 outputs the decision signal DS having a high level and the switch circuit 370 provides the calculating circuit 450 with the bits SG20, SG21, SG22 and SG23 of the second image component data provided from the second latch circuit 270a.

Figure 10:
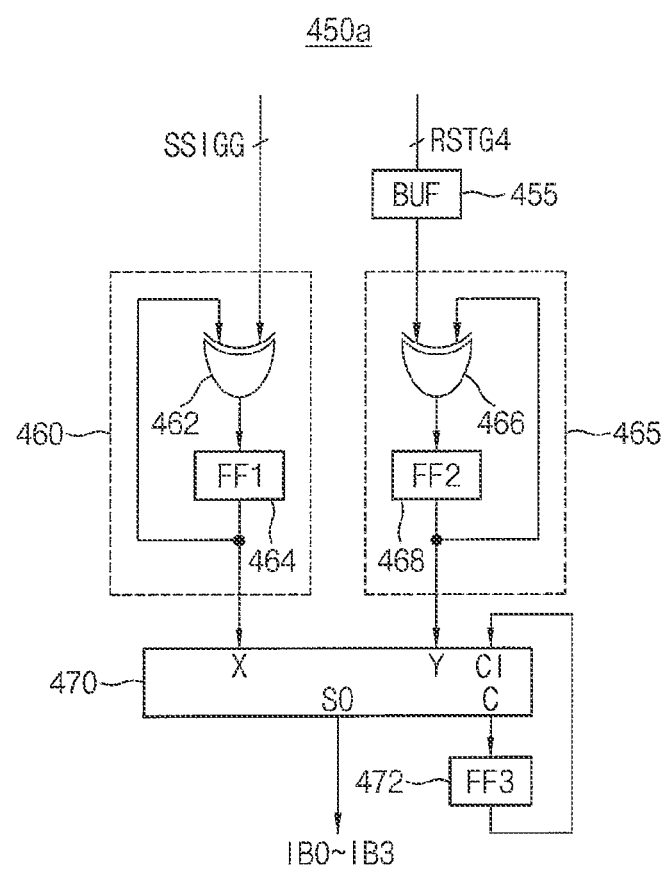
FIG. 10 is a circuit diagram illustrating an example of the calculating circuit in the digital CDS circuit of FIG. 8 according to example embodiments.

FIG. 10 is a circuit diagram illustrating an example of the calculating circuit in the digital CDS circuit of FIG. 8 according to example embodiments.

Referring to FIG. 10, the calculating circuit 450a may include a buffer 455, a first Gray-to-binary converter 460, a second Gray-to-binary converter 465 and a full adder 470. The calculating circuit 450a may further include a flip-flop 472.

The buffer 455 may sequentially store the bits of the second reset component data RSTG4 and may sequentially provide the bits of the second reset component data RSTG4 to the second Gray-to-binary converter 470.

The first Gray-to-binary converter 460 may generate a first binary code SIGB by performing a Gray-to-binary conversion on the selected image component data bit by bit. The first binary code SIGB may be a 4-bit binary code corresponding to the selected image component data and may include a first bit SB0 through a fourth bit SB3. The first Gray-to-binary converter 460 may include a first XOR gate 462 and a first flip-flop 464. Operation of the first Gray-to-binary converter 460 may be similar to operation of the first Gray-to-binary converter 410 in FIG. 3.

The second Gray-to-binary converter 465 may generate a second binary code RSTB by performing the Gray-to-binary conversion and a complement conversion on the second reset component data RSTG4 bit by bit. The second binary code RSTB may be a 4-bit binary code corresponding to a negative representation of the second reset component data RSTG4 and may include a first bit RB0 through a fourth bit RB3. The second Gray-to-binary converter 465 may include a second XOR gate 466 and a second flip-flop 468. Operation of the second Gray-to-binary converter 465 may be similar to operation of the second Gray-to-binary converter 420 in FIG. 3.

The full adder 470 may generate the effective image data by adding the first binary code SIGB and the second binary code RSTB bit by bit. The flip-flop 472 may store the carry output from the second output terminal C of the full adder 470.

Figure 11:
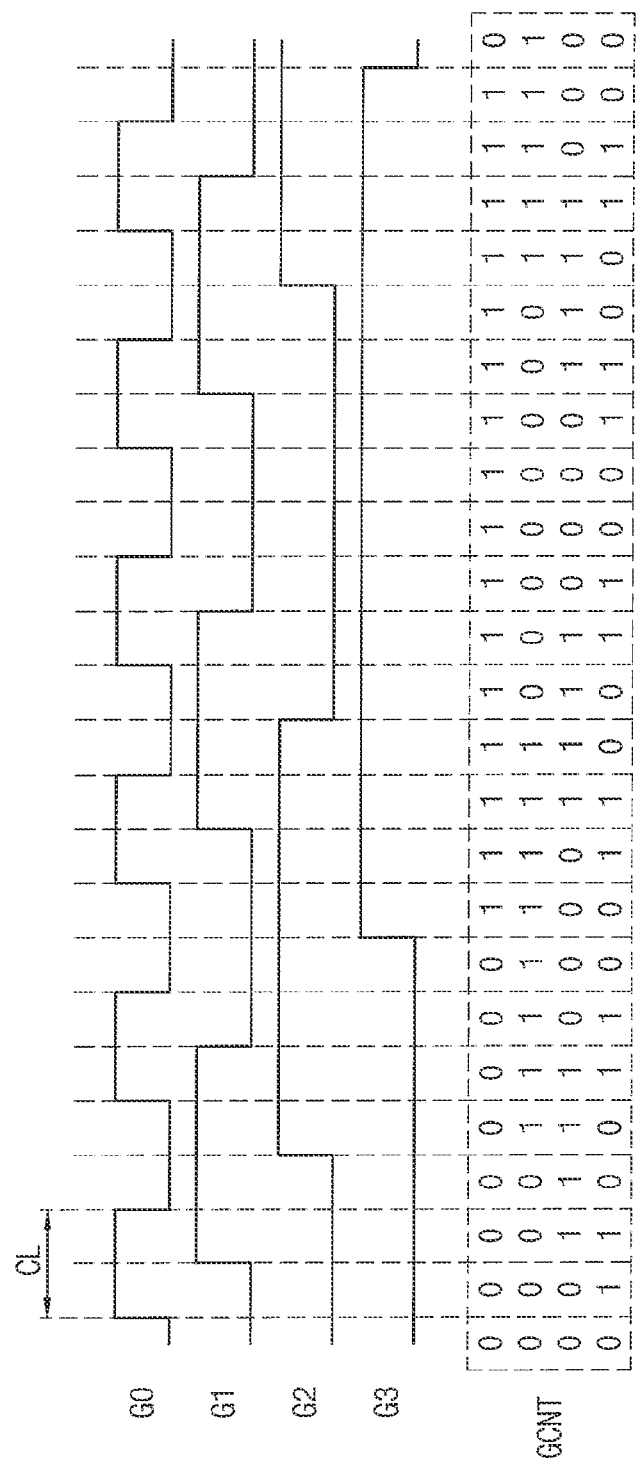
FIG. 11 illustrates an example of the count signal according to example embodiments.

FIG. 11 illustrates an example of the count signal according to example embodiments.

Referring to FIG. 11, the count signal GCNT may be a Gray code and may include bits G0, G1, G2 and G3. The bit G0 may be a LSB of the count signal GCNT.

A counting value of the count signal GCNT may be sequentially changed and one cycle CL of the LSB G0 may be a reference of the delay amount.

Figure 12:
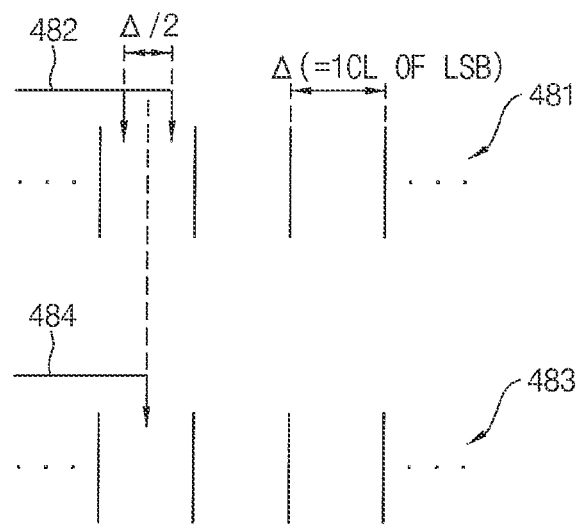
FIGS. 12 and 13 are diagrams for explaining that a timing of latching the image component data is determined in the digital CDS circuit of FIG. 1 or FIG. 8.
Figure 13:
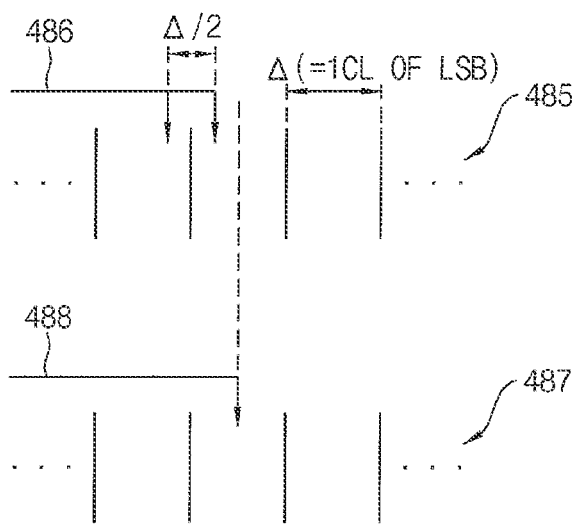

FIGS. 12 and 13 are diagrams for explaining that a timing of latching the image component data is determined in the digital CDS circuit of FIG. 1 or FIG. 8.

In FIGS. 12 and 13, Δ denotes an interval corresponding to the cycle CL of the LSB G0 of the count signal GCNT.

In FIG. 12, a reference numeral 481 represents reset component data and a reference numeral 482 indicates that the first reset component data RSTG1 and the second reset component data RSTG2 are latched by a gap Δ/2 in each of the first latch circuit 200 and the second latch circuit 250, respectively in the digital CDS circuit 100 of FIG. 1. Since the gap Δ/2 corresponds to the same cycle CL of the LSB G0 of the count signal GCNT, the first reset component data RSTG1 is the same as the second reset component data RSTG2, the image component data SIGG indicated by a reference numeral 483 is latched at a timing delayed by Δ/4 from a timing of latching the first reset component data RSTG1 as a reference numeral 484 indicates.

In FIG. 13, a reference numeral 485 represents reset component data and a reference numeral 486 indicates that the first reset component data RSTG1 and the second reset component data RSTG2 are latched by a gap Δ/2 in each of the first latch circuit 200 and the second latch circuit 250, respectively in the digital CDS circuit 100 of FIG. 1. Since the gap Δ/2 corresponds to different cycles CL of the LSB G0 of the count signal GCNT, the first reset component data RSTG1 is not the same as the second reset component data RSTG2, the image component data SIGG indicated by a reference numeral 487 is latched at a timing delayed by Δ3/4 from a timing of latching the first reset component data RSTG1 as a reference numeral 488 indicates.

Figure 14:
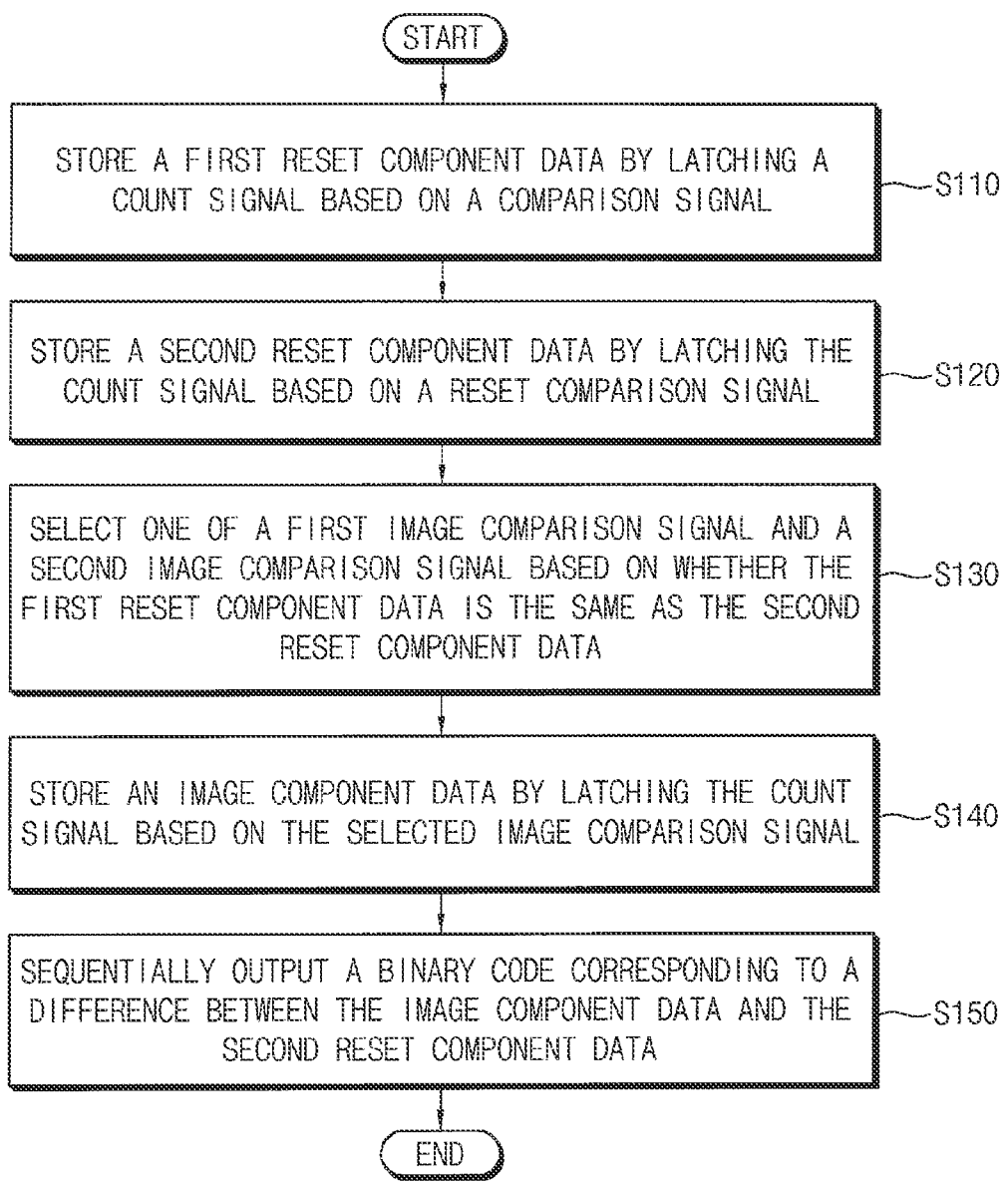
FIG. 14 is a flow chart illustrating an operation of the digital CDS circuit according to example embodiments.

FIG. 14 is a flow chart illustrating an operation of the digital CDS circuit according to example embodiments.

Referring to FIGS. 1 through 14, during the reset interval, the first latch circuit 200 may store first reset component data RSTG1 by latching the count signal GCNT based on a first comparison signal CS1 (operation S110). The second latch circuit 250 may store a second reset component data RSTG2 by latching the count signal GCNT based on a reset comparison signal RCS during the reset interval and may store an image component data SIGG by latching the count signal GCNT based on a selected comparison signal SCS during an image interval (operation S120). The reset comparison signal RCS may be obtained by delaying the first comparison signal CS1, and the selected comparison signal SCS may being selected from a first image comparison signal and a second image comparison signal which are obtained by delaying a second comparison signal CS2 by different delay amounts. The delay control circuit 350 may provide one of the first image comparison signal ICS1 and the second image comparison signal ICS2 based on the identity of the first reset component data RSTG1 and the second reset component data RSTG2 (operation S130). The first image comparison signal ICS1 and the second image comparison signal ICS2 may be obtained by delaying the second comparison signal CS2 by a second delay amount and a third delay amount, respectively. The second latch circuit 250 may store an image component data SIGG by latching the count signal GCNT based on a selected comparison signal SCS during an image interval (operation S140). The calculating circuit 400 generates effective image data IMGB by subtracting the second reset component data RSTG2 from the image component data SIGG bit by bit and sequentially outputs the digital effective image data IMGB bit by bit (operation S150).

Figure 15:
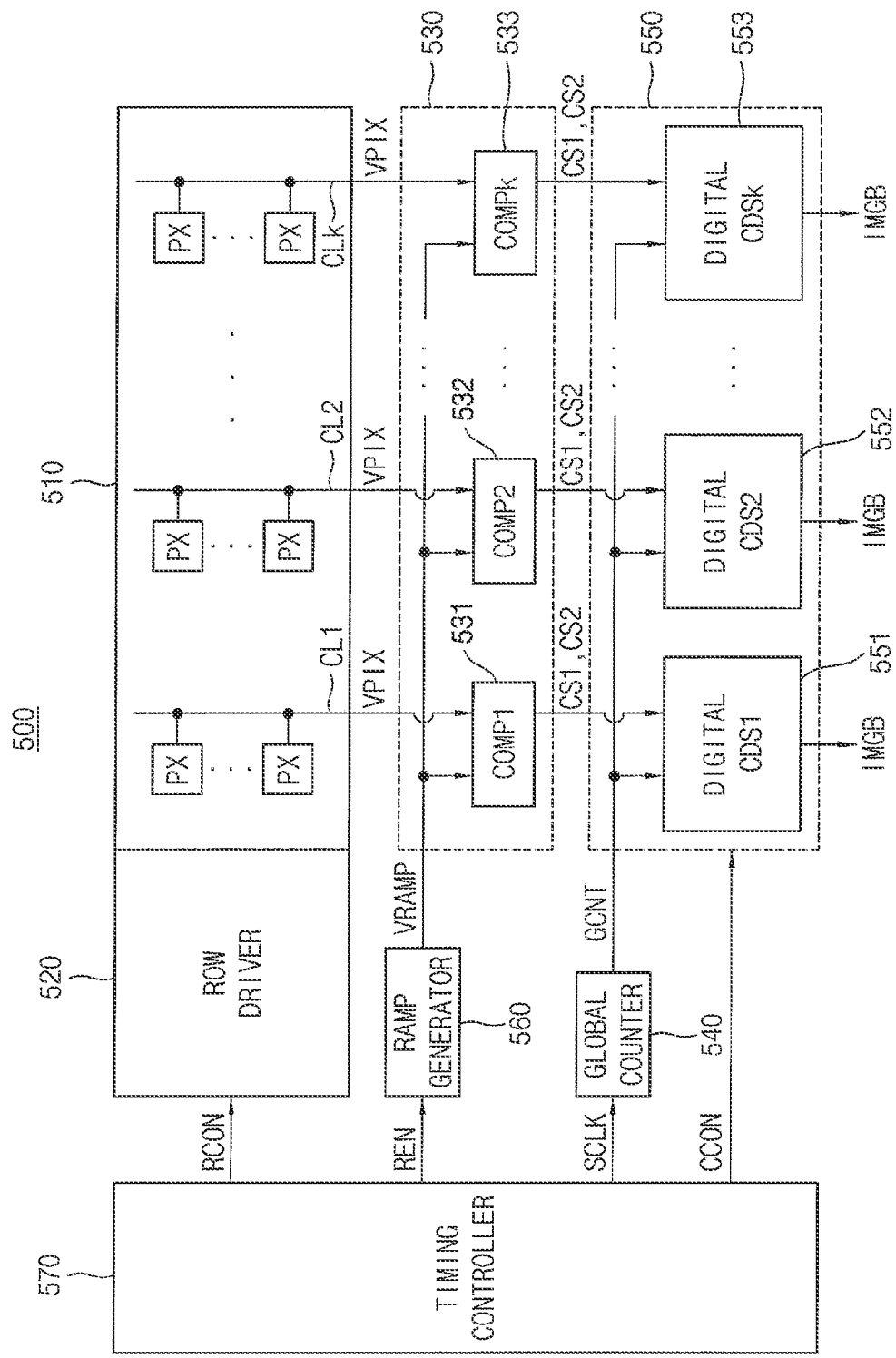
FIG. 15 is a block diagram illustrating an image sensor including the digital CDS circuit according to example embodiments.

FIG. 15 is a block diagram illustrating an image sensor including the digital CDS circuit according to example embodiments.

Referring to FIG. 15, an image sensor 500 includes a pixel array 510, a comparison block 530, a global counter 540 and a digital correlated double sampling (CDS) block 550. The image sensor 500 may further include a row driver 520, a ramp voltage generator 560 and a timing controller 570.

The pixel array 510 generates a plurality of analog pixel signals VPIX based on incident light. The pixel array 510 may include a plurality of unit pixels PX that are arranged in a matrix of a plurality of rows and a plurality of columns. Unit pixels PX may be coupled to each of column lines CL1~CLk by unit of a column.

Figure 16:
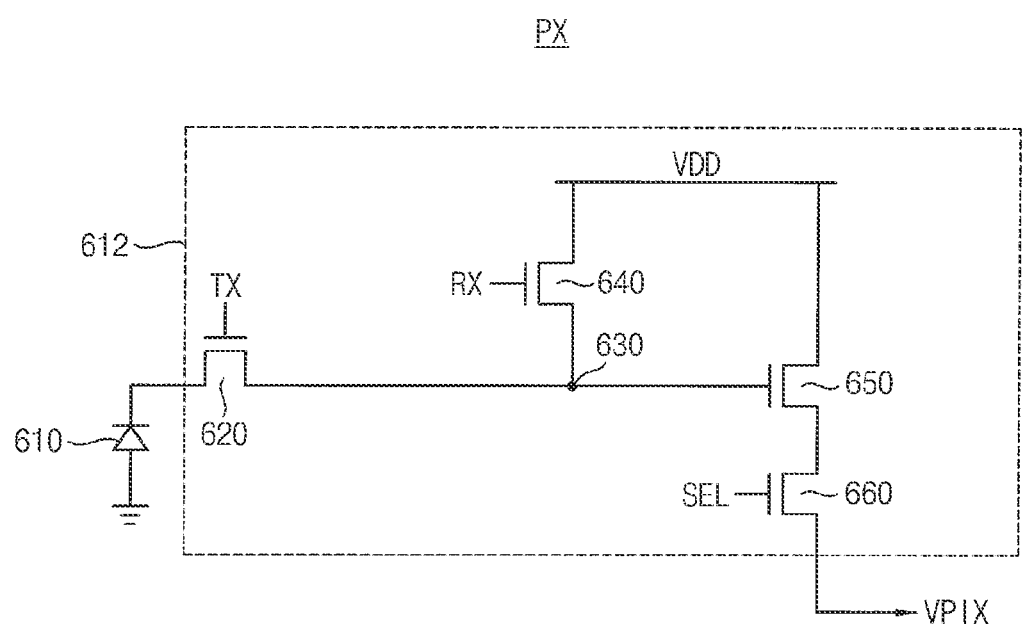
FIG. 16 is a circuit diagram illustrating an example of a unit pixel included in the image sensor of FIG. 15.

FIG. 16 is a circuit diagram illustrating an example of a unit pixel included in the image sensor of FIG. 15.

Referring to FIG. 16, a unit pixel PX may include a photoelectric conversion element 610 and a signal generation circuit 612.

The photoelectric conversion element 610 may perform a photoelectric conversion operation. For example, the photoelectric conversion element 610 may convert the incident light into photo-charges during an integration mode. If an image sensor including the unit pixel PX is a CMOS image sensor, image information on an object to be captured may be obtained by collecting charge carriers (e.g., electron-hole pairs) in the photoelectric conversion element 610 proportional to intensity of the incident light through an open shutter of the CMOS image sensor during the integration mode The signal generation circuit 612 may generate an electric signal (e.g., the analog pixel signal VPIX) based on the photo-charges generated by the photoelectric conversion operation during a readout mode. If the image sensor including the unit pixel PX is the CMOS image sensor, the shutter may be closed, and the analog pixel signal VPIX may be generated based on the image information in a form of the charge carriers during the readout mode after the integration mode.

The unit pixel PX may have various structures including, for example, one-transistor structure, three-transistor structure, four-transistor structure, five-transistor structure, structure where some transistors are shared by a plurality of unit pixels, etc. For example, as illustrated in FIG. 16, the unit pixel PX may have a four-transistor structure. In this case, the signal generation circuit 612 may include a transfer transistor 620, a reset transistor 640, a drive transistor 650, a selection transistor 660 and a floating diffusion node 630.

The transfer transistor 620 may include a first electrode connected to the photoelectric conversion unit 610, a second electrode connected to the floating diffusion node 630, and a gate electrode receiving a transfer signal TX. The reset transistor 640 may include a first electrode receiving a power supply voltage VDD, a second electrode connected to the floating diffusion node 630, and a gate electrode receiving a reset signal RX. The drive transistor 650 may include a first electrode receiving the power supply voltage VDD, a gate electrode connected to the floating diffusion node 630, and a second electrode. The selection transistor 660 may include a first electrode connected to the second electrode of the drive transistor 650, a gate electrode receiving a selection signal SEL, and a second electrode outputting the analog pixel signal VPIX.

Referring back to FIG. 15, the row driver 520, the comparison block 530, the global counter 540, the digital CDS block 550, the ramp voltage generator 560 and the timing controller 570 may be included in a signal processing unit that generates a plurality of effective image data IMGB based on the analog pixel signals VPIX.

The row driver 520 may be connected with each row of the pixel array 510. The row driver 520 may generate driving signals to drive each row. For example, the row driver 520 may drive the plurality of unit pixels included in the pixel array 510 row by row. The voltage generator 560 may generate a ramp signal VRAMP based on a ramp enable signal REN.

The comparison block 530 generates a plurality of first comparison signals CS1 and a plurality of second comparison signals CS2 by comparing the plurality of analog pixel signals VPIX with the ramp signal VRAMP. The comparison block 530 includes a plurality of comparators 531, 532, . . . , 533. Each of the plurality of comparators 531, 532, . . . , 533 is connected with a respective one of the column lines CL1~CLk of the pixel array 510 and receives a respective one of the plurality of analog pixel signals VPIX.

The global counter 540 generates a count signal GCNT based on a counter clock signal SCLK. For example, the global counter 540 may be a Gray code counter, and the count signal GCNT may be a Gray code count signal.

The digital CDS block 550 generates the plurality of effective image data IMGB corresponding to the plurality of analog pixel signals VPIX by performing a digital CDS based on the plurality of first and second comparison signals CS1 and CS2 and the count signal GCNT. The digital CDS block 550 includes a plurality of digital CDS circuits 551, 552, . . . , 553. Each of the plurality of digital CDS circuits 551, 552, . . . , 553 is connected to a respective one of the plurality of comparators 531, 532, . . . , 533 and may receive a respective one of the plurality of first comparison signals CS1 and a respective one of the plurality of second comparison signals CS2.

The comparison block 530, the global counter 540 and the digital CDS block 550 may be included in an analog-to-digital converting (ADC) unit.

Each of the plurality of digital CDS circuits 551, 552, . . . , 553 may be the digital CDS circuit 100 of FIG. 1 and may be implemented with the examples described above with reference to FIGS. 2A through 3. In addition, each of the plurality of digital CDS circuits 551, 552, . . . , 553 may be the digital CDS circuit 100c of FIG. 8 and may be implemented with the examples described above with reference to FIGS. 9A through 10. In other words, each of the plurality of digital CDS circuits 551, 552, . . . , 553 may determine timing of latching the image component data based on whether the first reset component data is the same as the second reset component data and may reduce quantization noise without increasing a number of bits of the count signal GCNT.

The timing controller 570 may control the row driver 520, the comparison block 530, the global counter 540, the digital CDS block 550 and the voltage generator 560. The timing controller 570 may generate a row driver control signal RCON, the ramp enable signal REN, the count clock signal CLK, CDS control signal CCON, etc.

Although not illustrated in FIG. 9, the image sensor may further include a digital signal processing (DSP) unit (not illustrated) that performs an image data processing on the plurality of digital effective image data IMGB.

Figure 17:
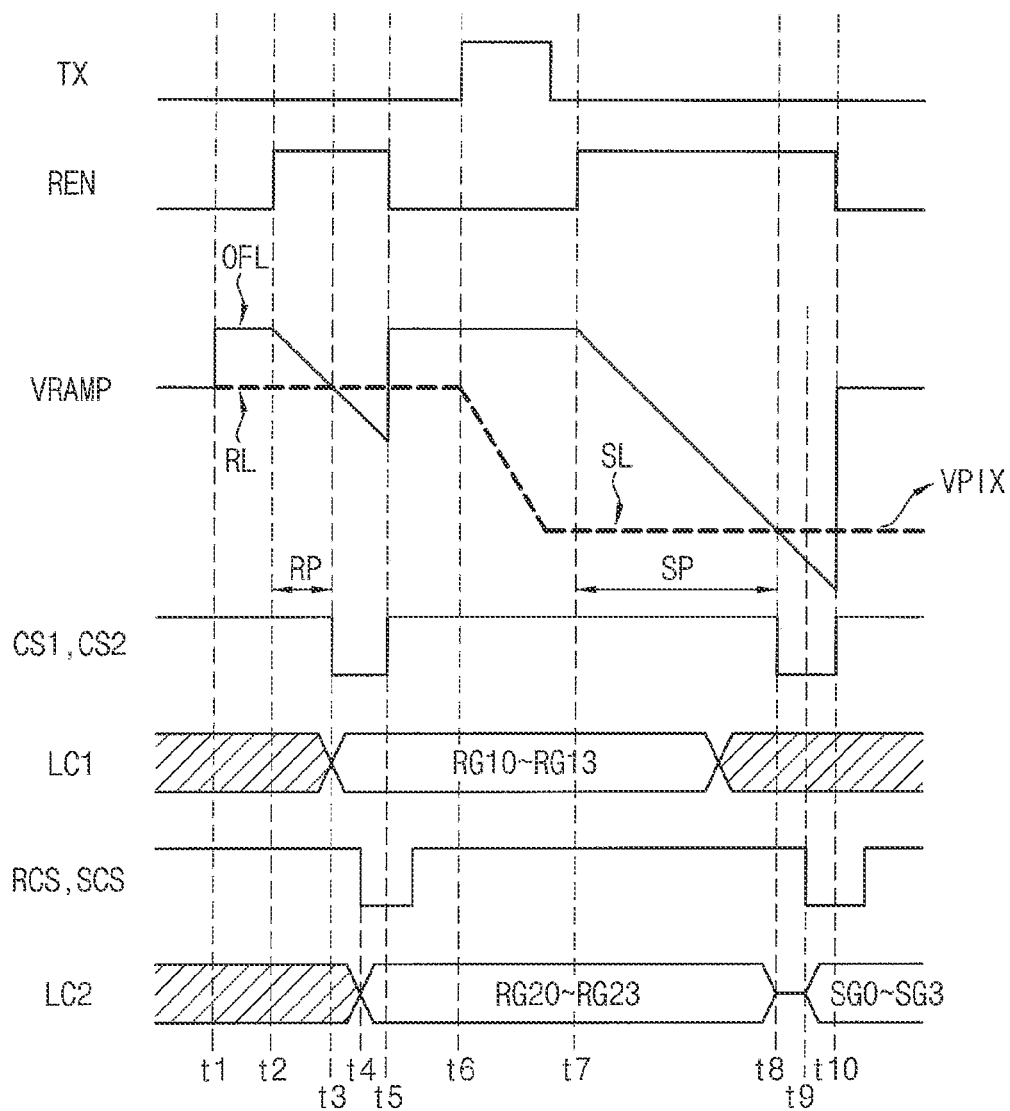
FIG. 17 is a timing diagram for describing an operation of the image sensor of FIG. 15.

FIG. 17 is a timing diagram for describing an operation of the image sensor of FIG. 15.

Hereinafter, the operation of the image sensor 500 according to example embodiments will be described in detail with reference to FIGS. 15, 16 and 17.

When an external light is incident onto the photoelectric conversion element 610 during the integration mode, electron-hole pairs are generated in proportion to the amount of the incident light.

During the readout mode after the integration mode, the selection signal SEL is activated, and a first row of the pixel array 510 connected to the unit pixel PX is selected in response to the selection signal SEL. In addition, the reset signal RX is activated, the reset transistor 640 is turned on in response to the reset signal RX, and an electric potential of the floating diffusion node 630, which is a sensing node, is reset to the power supply voltage VDD. The analog pixel signal VPIX output from the unit pixel PX has a reset level RL corresponding to a reset state of the floating diffusion node 630.

At time t1, the ramp signal VRAMP has an offset level OFL. At time t2, the ramp enable signal REN is activated, and thus the ramp signal VRAMP is activated during a first comparison interval from time t2 to time t5. The first control signal CS1 is transitioned from a logic high level to a logic low level at a time point at which the ramp signal VRAMP is intersected with the analog pixel signal VPIX (e.g., at time t3). Operation of each of the plurality of digital CDS circuits 551, 552, . . . , 553 is substantially the same as the operation illustrated in FIG. 4.

At time t5, the ramp enable signal REN is deactivated, and thus the ramp signal VRAMP is deactivated during an interval from time t5 to time t7. At time t6, the transfer signal TX is activated, the transfer transistor 620 is turned on in response to the transfer signal TX, and the photo-charges collected within the photoelectric conversion element 610 are transferred to the floating diffusion node 630 through the transfer transistor 620. After time t6, the transfer signal TX is deactivated when the charge transferring operation is finished, and then the analog pixel signal VPIX has an image level SL corresponding to the incident light.

At time t7, the ramp enable signal REN is activated, and thus the ramp signal VRAMP is activated during a second comparison interval from time t7 to time t9. Operation of each of the plurality of digital CDS circuits 551, 552, . . . , 553 is substantially the same as the operation illustrated in FIG. 4.

Figure 18:
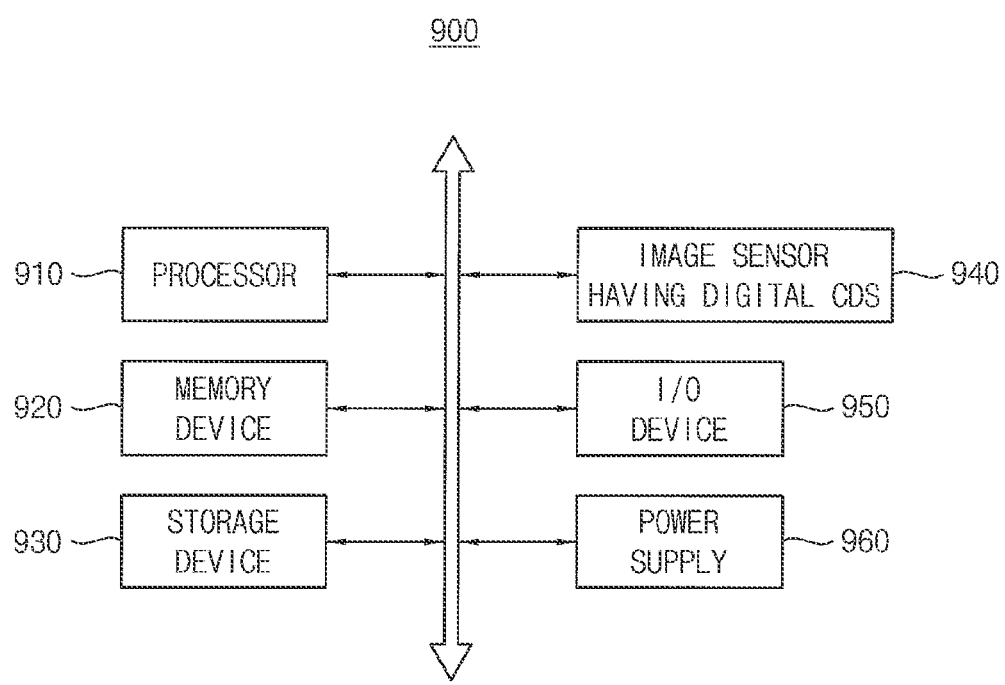
FIG. 18 is a block diagram illustrating a computing system including the image sensor according to example embodiments.

FIG. 18 is a block diagram illustrating a computing system including the image sensor according to example embodiments.

Referring to FIG. 18, a computing system 900 may include a processor 910, a memory device 920, a storage device 930, an image sensor 940, an input/output (I/O) device 950 and a power supply 960. Although not illustrated in FIG. 18, the computing system 900 may further include ports that communicate with a video card, a sound card, a memory card, a universal serial bus (USB) device, or other electronic devices.

The processor 910 may perform various calculations or tasks. According to example embodiments, the processor 910 may be a microprocessor or a central processing unit (CPU). The processor 910 may communicate with the memory device 920, the storage device 930 and the I/O device 950 via an address bus, a control bus, and/or a data bus. In some example embodiments, the processor 910 may be coupled to an extended bus, such as a peripheral component interconnection (PCI) bus.

The memory device 920 may store data for operating the computing system 900.

The storage device 930 may include a solid state drive (SSD), a hard disk drive (HDD), a CD-ROM, etc. The I/O device 950 may include an input device (e.g., a keyboard, a keypad, a mouse, etc.) and an output device (e.g., a printer, a display device, etc.). The power supply 960 may supply operation voltages for the computing system 900.

The image sensor 940 may communicate with the processor 910 via the bus or other communication links. The image sensor 940 may be the image sensor 500 of FIG. 15 and may include a plurality of digital CDS circuits. The image sensor 940 may be packaged in various forms.

Figure 19:
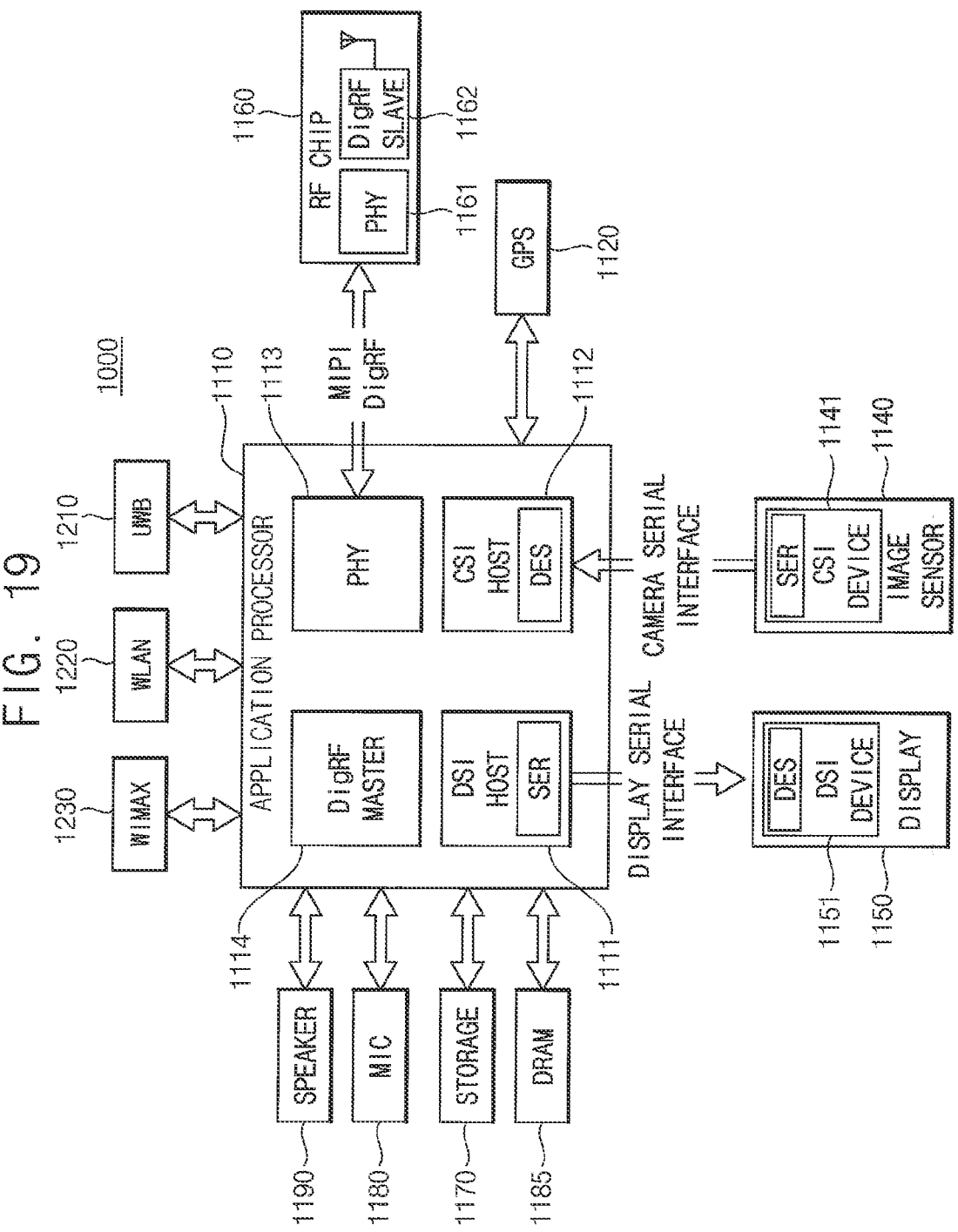
FIG. 19 is a block diagram illustrating an example of an interface employable in the computing system of FIG. 18.

FIG. 19 is a block diagram illustrating an example of an interface employable in the computing system of FIG. 18.

Referring to FIG. 19, a computing system 1000 may be implemented by a data processing device that uses or supports a mobile industry processor interface (MIPI) interface. The computing system 1000 may include an application processor 1110, an image sensor 1140, a display device 1150, etc.

A camera serial interface (CSI) host 1112 of the application processor 1110 may perform a serial communication with a CSI device 1141 of the image sensor 1140 via a CSI. In some example embodiments, the CSI host 1112 may include a deserializer (DES), and the CSI device 1141 may include a serializer (SER). A display serial interface (DSI) host 1111 of the application processor 1110 may perform a serial communication with a DSI device 1151 of the display device 1150 via a DSI. In some example embodiments, the DSI host 1111 may include a serializer (SER), and the DSI device 1151 may include a deserializer (DES).

The computing system 1000 may further include a radio frequency (RF) chip 1160 performing a communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications of the PHY 1113. The RF chip 1160 may further include a DigRF SLAVE 1162 that is controlled through the DigRF MASTER 1114.

The computing system 1000 may further include a global positioning system (GPS) 1120, a storage 1170, a MIC 1180, a DRAM device 1185, and a speaker 1190. In addition, the computing system 1000 may perform communications using an ultra wideband (UWB) 1210, a wireless local area network (WLAN) 1220, a worldwide interoperability for microwave access (WIMAX) 1230, etc. However, the structure and the interface of the computing system 1000 are not limited thereto.

The above described embodiments may be applied to an image sensor including a digital CDS circuit and an electronic system including the image sensor. For example, the electronic system may be a system using the image sensor, e.g., a computer, a digital camera, a 3D camera, a cellular phone, a PDA, a scanner, a navigation system, a video phone, a surveillance system, an auto-focusing system, a tracking system, a motion-sensing system and/or an image-stabilization system.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A digital correlated double sampling (CDS) circuit comprising:
   a first latch circuit configured to store first reset component data by latching a count signal based on a first comparison signal during a reset interval;
   a second latch circuit configured to store second reset component data by latching the count signal based on a reset comparison signal during the reset interval and configured to store an image component data by latching the count signal based on a selected comparison signal during an image interval, the selected comparison signal being selected from a first image comparison signal and a second image comparison signal;
   a decision circuit configured to output a decision signal by determining identity of the first reset component data and the second reset component data during the reset interval;
   a delay control circuit configured to output the reset comparison signal by delaying the first comparison signal based on an interval direction signal indicating one of the reset interval and the image interval during the reset interval and configured to output one of the first image comparison signal and a second comparison signal as the selected comparison signal based on the interval direction signal and the decision signal during the image interval; and a calculating circuit configured to generate effective image data by subtracting the second reset component data from the image component data and configured to sequentially output the effective image data.

2. The digital CDS circuit of claim 1, wherein:

the count signal corresponds to Gray code count signal; and the decision circuit is configured to determine whether a first latching timing of the count signal by the first latch circuit and a second latching timing of the count signal by the second latch circuit correspond to a cycle of a least significant bit (LSB) of the Gray code count signal by determining the bit-wise identity of the first reset component data and the second reset component data.

3. The digital CDS circuit of claim 1, wherein the decision circuit includes:

a plurality of XOR gates configured to perform an XOR operation on each bit of the first reset component data and a respective bit of the second reset component data; and an OR gate configured to output the decision signal by performing an OR operation on outputs of the XOR gates.

4. The digital CDS circuit of claim 1, wherein:

the delay control circuit is configured to:

delay the first comparison signal by a first delay amount to provide the reset comparison signal to the second latch circuit in response to the interval direction signal during the reset interval; and delay the second comparison signal by a second delay amount and a third delay amount, respectively, to generate the first image comparison signal and the second image comparison signal and provide one of the first image comparison signal and the second image comparison signal to the second latch circuit as the selection comparison signal, based on interval direction signal and the decision signal, during the image interval, the first delay amount corresponds to a half of a cycle of a least significant bit (LSB) of a clock signal, the second delay amount corresponds to a quarter of the cycle of the LSB of the clock signal, and the third delay amount corresponds to three quarters of the cycle of the LSB of the clock signal.

5. The digital CDS circuit of claim 1, wherein the delay control circuit includes:

a first delay cell configured to delay each of the first comparison signal and the second comparison signal by a unit delay amount during each of the reset interval and the image interval to provide the first image comparison signal;

a second delay cell configured to delay an output of the first delay cell by the unit delay amount to provide the reset comparison signal;

a third delay cell configured to delay an output of the second delay cell by the unit delay amount to provide the second image comparison signal; and a multiplexer configured to receive the output of the first delay cell, the output of the second delay cell and an output of the third delay cell, configured to output the reset comparison signal based on the interval direction signal during the reset interval, and configured to output one of the first image comparison signal and the second image comparison signal based on the interval direction signal and the decision signal during the image interval.

6. The digital CDS circuit of claim 5, wherein the multiplexer is configured to:

output the first image comparison signal as the selected comparison signal in response to the decision signal indicating that the first reset component data matches the second reset component data; and output the second image comparison signal as the selected comparison signal in response to the decision signal indicating that the first reset component data does not match the second reset component data.

7. The digital CDS circuit of claim 1, wherein:

the first latch circuit includes a plurality of first latches and each of plurality of first latches is configured to store one of bits of the first reset component data by latching a respective one of bits of the count signal based on the first comparison signal during the reset interval, and the second latch circuit includes:

a plurality of second latches, each of the plurality of second latches being configured to store one of bits of the second reset component data by latching a respective one of bits of the count signal based on the first comparison signal during the reset interval and configured to store one of bits of the image component data by latching a respective one of bits of the count signal based on the selected comparison signal during the image interval; and a plurality of switches, each of plurality of switches being configured to selectively connect an output terminal of a respective one of the plurality of second latches to a first signal line coupled to the calculating circuit, in response to a switching control signal.

8. The digital CDS circuit of claim 1, wherein:

the image component data is a first Gray code, and the second reset component data is a second Gray code, and the calculating circuit is configured to sequentially generate bits of a first binary code corresponding to the first Gray code, configured to sequentially generate bits of a second binary code corresponding to a negative representation of the second Gray code, and configured to generate the effective image data by sequentially adding the bits of the first binary code and the bits of the second binary code.

9. The digital CDS circuit of claim 8, wherein the calculating circuit includes:

a first Gray-to-binary converter configured to generate the first binary code by performing a Gray-to-binary conversion on the image component data;

a second Gray-to-binary converter configured to generate the second binary code by performing the Gray-to-binary conversion and a complement conversion on the second reset component data; and a 1-bit full adder configured to generate the effective image data by adding the first binary code and the second binary code.

10. The digital CDS circuit of claim 9, wherein:

the first Gray-to-binary converter includes:

an XOR gate; and a flip-flop configured to store an output of the XOR gate, and the XOR gate is configured to generate one bit of the first binary code by performing an XOR operation on one bit of the image component data and an output of the flip-flop.

11. The digital CDS circuit of claim 9, wherein:
the second Gray-to-binary converter includes:
  a XOR gate; and
  a flip-flop configured to store an output of the XOR gate, and
the XOR gate is configured to generate one bit of the second binary code by performing an XOR operation on one bit of the second reset component data and an output of the flip-flop.

12. A digital correlated double sampling (CDS) circuit comprising:
  a first latch circuit configured to store first reset component data by latching a first count signal based on a first comparison signal during a reset interval and configured to store first image component data by latching the first count signal based on a second comparison signal during an image interval;
  a second latch circuit configured to store second reset component data by latching a second count signal based on the first comparison signal during the reset interval and configured to store second image component data by latching the second count signal based on the second comparison signal during the image interval, the second count signal being obtained by delaying the first count signal by a first delay amount;
  a decision circuit configured to output a decision signal based on an interval direction signal during the reset interval and configured to output the decision signal based on the interval direction signal and identity of the first image component data and the second image component data;
  a switch circuit, connected to the first latch circuit and the second latch circuit, configured to output the second reset component data during the reset interval and configured to output one of the first image component data and the second image component data as a selected image component data during the image interval; and
  a calculating circuit, connected to the switch circuit, configured to generate effective image data by subtracting the second reset component data from the selected image component data and configured to sequentially output the effective image data, wherein the interval direction signal designates one of the reset interval and the image interval.

13. The digital CDS circuit of claim 12, wherein:
each of the first count signal and the second count signal corresponds to a Gray code count signal; and
the decision circuit is configured to determine whether a first latching timing of the first count signal by the first latch circuit and a second latching timing of the second count signal by the second latch circuit correspond to a cycle of a least significant bit (LSB) of the Gray code count signal by determining the bit-wise identity of the first image component data and the second image component data.

14. The digital CDS circuit of claim 12, further comprising:
  a counter circuit configured to generate the first count signal and the second count signal based on a counter clock signal, wherein the counter circuit includes:
    a delay cell configured to delay the counter clock signal by unit delay amount to output a delayed clock signal;
    a multiplexer configured to select one of the counter clock signal and the delay clock signal to provide a selected clock signal based on the interval direction signal;
    a first Gray code counter configured to output the first count signal based on a rising edge of the selected clock signal; and
    a second Gray code counter configured to output the second count signal based on a falling edge of the selected clock signal.

15. The digital CDS circuit of claim 14, wherein the multiplexer is configured to:
select the counter clock signal as the selected clock signal in response to the interval direction signal designating the reset interval; and
select the delayed counter clock signal as the selected clock signal in response to the interval direction signal designating the image interval.

16. The digital CDS circuit of claim 12, wherein the decision circuit includes:
  a plurality of XOR gates configured to perform an XOR operation on each bit of the first image component data and corresponding bit of the second image component data; and
  an OR gate configured to output the decision signal by performing an OR operation on outputs of the XOR gates and the interval direction signal.

17. The digital CDS circuit of claim 12, wherein:
the first latch circuit includes:
  a plurality of first latches, each of plurality of first latches being configured to store one of bits of the first reset component data by latching a respective one of bits of the first count signal based on the first comparison signal during the reset interval and configured to store one of bits of the first image component data by latching a respective one of bits of the first count signal based on the second comparison signal during the image interval; and
  a plurality of first switches, each of plurality of first switches being configured to selectively connect an output terminal of a respective one of the plurality of first latches to a first signal line coupled to the calculating circuit, in response to a switching control signal, and
the second latch circuit includes:
  a plurality of second latches, each of plurality of second latches being configured to store one of bits of the second reset component data by latching a respective one of bits of the second count signal based on the first comparison signal during the reset interval and configured to store one of bits of the second image component data by latching a respective one of bits of the second count signal based on the second comparison signal during the image interval; and
  a plurality of second switches, each of plurality of second switches being configured to selectively connect an output terminal of a respective one of the plurality of second latches to a second signal line coupled to the calculating circuit, in response to the switching control signal.

18. The digital CDS circuit of claim 12, wherein:
the switch circuit includes:
  a first switch connected to the first latch circuit through a first signal line, the first switch configured to selectively connect the first signal line to the calculating circuit based on the decision signal; and a second switch connected to the second latch circuit through a second signal line, the second switch configured to selectively connect the second signal line to the calculating circuit based on the decision signal, and the switch circuit is configured to:
connect the second signal line to the calculating circuit based on the decision signal during the reset interval;
connect the first signal line to the calculating circuit based on the decision signal indicating that the first image component data matches the second image component data during the image interval; and
connect the second signal line to the calculating circuit based on the decision signal indicating that the first image component data does not match the second image component data during the image interval.

19. The digital CDS circuit of claim 12, wherein:
the selected image component data is a first Gray code, and the second reset component data is a second Gray code, and
the calculating circuit is configured to sequentially generate bits of a first binary code corresponding to the first Gray code, configured to sequentially generate bits of a second binary code corresponding to a negative representation of the second Gray code, and configured to generate the effective image data by sequentially adding the bits of the first binary code and the bits of the second binary code.

20. An image sensor comprising:
a pixel array configured to generate a plurality of analog pixel signals based on incident light;
a comparison block configured to generate a plurality of first comparison signals and a plurality of second comparison signals by comparing the plurality of analog pixel signals with a ramp signal;
a global counter configured to generate a count signal based on a counter clock signal; and
a digital correlated double sampling (CDS) block configured to generate a plurality of effective image data corresponding to the plurality of analog pixel signals by performing a digital CDS based on the plurality of first comparison signals, the plurality of second comparison signals and the count signal, wherein:

the comparison block includes a plurality of comparators, each comparator receives a respective one of the plurality of analog pixel signals, the digital CDS block includes a plurality of digital CDS circuits, and each digital CDS circuit is connected to a respective one of the plurality of comparators, and each digital CDS circuit includes:
a first latch circuit configured to store first reset component data by latching the count signal based on a respective one of the plurality of first comparison signals during a reset interval;
a second latch circuit configured to store second reset component data by latching the count signal based on a reset comparison signal during the reset interval and configured to store image component data by latching the count signal based on a selected comparison signal during an image interval, the selected comparison signal being selected from a first image comparison signal and a second image comparison signal, the first image comparison signal and the second image comparison signal being obtained by delaying a respective one of the plurality of second comparison signals;
a decision circuit configured to output a decision signal by determining bit-wise identity of the first reset component data and the second reset component data;
a delay control circuit configured to output the reset comparison signal by delaying the first comparison signal based on an interval direction signal indicating one of the reset interval and the image interval during the reset interval, and configured to output one of the first image comparison signal and the second comparison signal as the selected comparison signal based on the interval direction signal and the decision signal during the image interval; and
a calculating circuit configured to generate effective image data by subtracting the second reset component data from the image component data and configured to sequentially output the effective image data.

* * * * *